(12) United States Patent
Stevenson et al.

(10) Patent No.: US 10,725,582 B2
(45) Date of Patent: Jul. 28, 2020

(54) METHODS AND SYSTEMS FOR DYNAMICALLY ADJUSTING COMBINATION SIGNALS

(71) Applicant: Synaptics Incorporated, San Jose, CA (US)

(72) Inventors: Matthew Stevenson, San Jose, CA (US); David Hoch, San Jose, CA (US)

(73) Assignee: Synaptics Incorporated, San Jose, CA (US)

(*) Notice: Subject to any disclaimer, the term of this patent is extended or adjusted under 35 U.S.C. 154(b) by 56 days.

(21) Appl. No.: 16/104,484

(22) Filed: Aug. 17, 2018

(65) Prior Publication Data

US 2019/0056823 A1      Feb. 21, 2019

Related U.S. Application Data

(60) Provisional application No. 62/547,603, filed on Aug. 18, 2017.

(51) Int. Cl.
| | | |
|---|---|---|
| *G09G 1/00* | (2006.01) | |
| *G06F 3/041* | (2006.01) | |
| *G06F 3/044* | (2006.01) | |

(52) U.S. Cl.
CPC ...... *G06F 3/041662* (2019.05); *G06F 3/0418* (2013.01); *G06F 3/0445* (2019.05); *G06F 3/0446* (2019.05); *G06F 3/0412* (2013.01); *G06F 2203/04107* (2013.01)

(58) Field of Classification Search
CPC .......... G06F 19/00; G06F 3/044; G06F 3/041; G06F 3/0412; G06F 3/0481; G06F 3/0488

See application file for complete search history.

(56) References Cited

U.S. PATENT DOCUMENTS

2010/0292945 A1* 11/2010 Reynolds ................ G06F 3/044
                                                              702/65

* cited by examiner

*Primary Examiner* — Michael A Faragalla
(74) *Attorney, Agent, or Firm* — Ferguson Braswell Fraser Kubasta PC

(57) ABSTRACT

The invention relates to a processing system. The processing system includes a determination module configured to make a determination that a low ground mass condition associated with an input device exists in an initial combination signal obtained from a sensor module using initial sensor settings. Based on the determination, adjusted sensor settings are determined, and an adjusted combination signal is obtained, using the adjusted sensor settings and, using the adjusted combination signal, object information for one or more input objects in a sensing region of the input device is obtained. The sensor module is configured to generate, using a first sensor electrode, a second sensor electrode, and the adjusted sensor settings, the adjusted combination signal. The adjusted combination signal includes effects of a transcapacitive coupling between the first sensor electrode and the second sensor electrode and effects of an absolute capacitive coupling between the second sensor electrode and the input object.

20 Claims, 21 Drawing Sheets

700

Drive a modulated signal onto a first sensor electrode of a sensor electrode pattern
701

Receive first resulting signals from the first sensor electrode
702

Receive second resulting signals from a second sensor electrode of the sensor electrode pattern, the second resulting signals including effects corresponding to the modulated signal, and wherein the first resulting signals and the second resulting signals are simultaneously received
703

Determine a change in capacitive coupling between an input object and the first sensor electrode based on the first resulting signals and change in capacitive coupling between the first and second sensor electrodes based on the second resulting signals
704

FIG. 7A

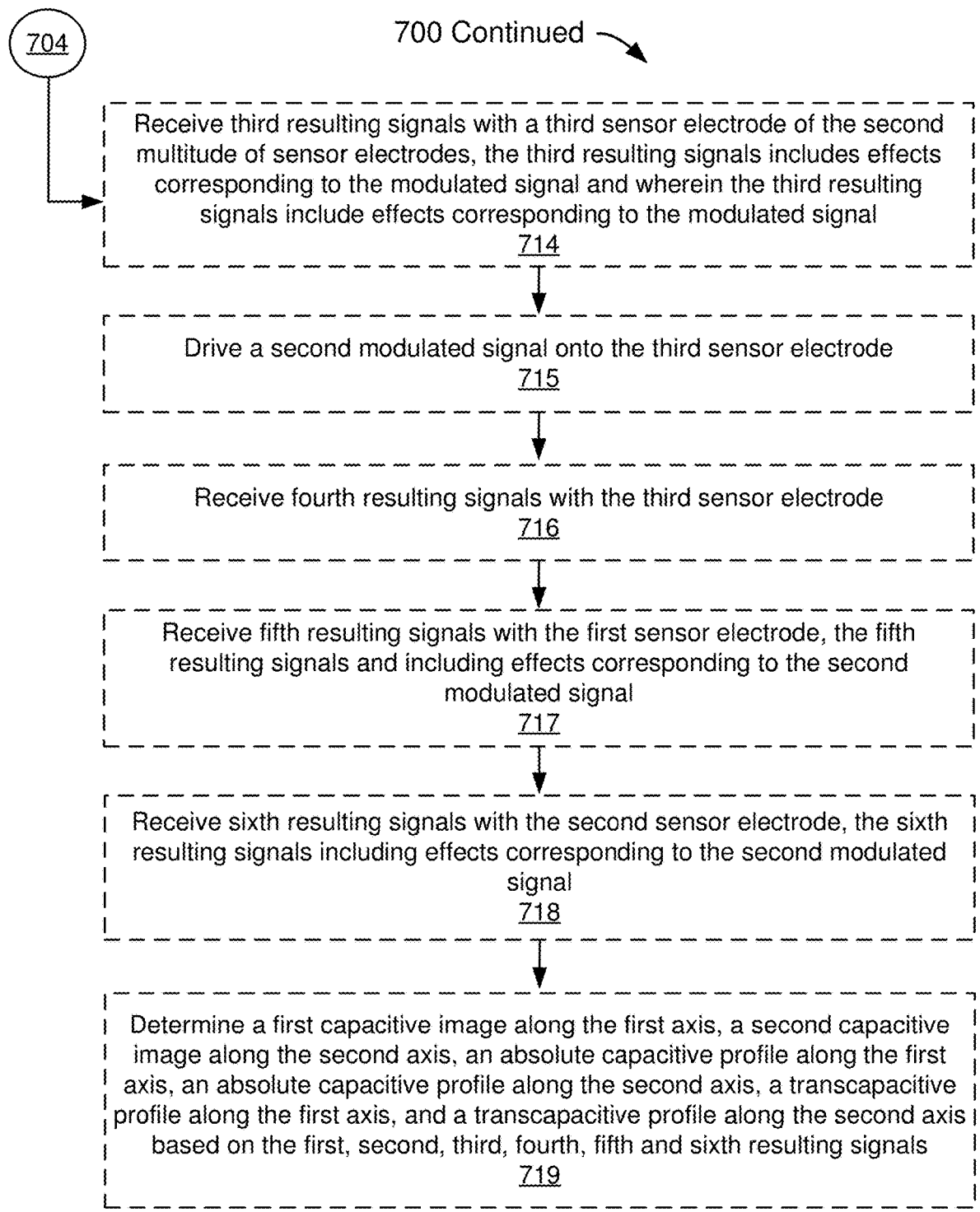

METHODS AND SYSTEMS FOR DYNAMICALLY ADJUSTING COMBINATION SIGNALS

CROSS REFERENCE TO RELATED APPLICATIONS

The present application claims priority under 35 U.S.C. § 119(e) to U.S. Provisional Application No. 62/547,603, filed on Aug. 18, 2017, having at least one of the same inventors as the present application, and entitled, "METHODS AND SYSTEMS FOR USING TABS PROFILES BASED ON LOW GROUND MASS CONDITIONS". U.S. Provisional Application No. 62/547,603 is incorporated herein by reference.

FIELD

This disclosed technology generally relates to electronic devices and specifically to capacitive sensing profiles.

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones and tablet computers). Such touch screen input devices are typically superimposed upon or otherwise collocated with a display of the electronic system.

SUMMARY

In general, in one aspect, one or more embodiments relate to a processing system. The processing system includes a determination module, configured to make a determination that a low ground mass (LGM) condition associated with an input device exists in an initial combination signal obtained from a sensor module using initial sensor settings, and based on the determination: determine adjusted sensor settings, and obtain an adjusted combination signal, using the adjusted sensor settings, and obtain, using the adjusted combination signal, object information for one or more input objects in a sensing region of the input device. The processing system further includes the sensor module, configured to: generate, using a first sensor electrode, a second sensor electrode, and the adjusted sensor settings, the adjusted combination signal, wherein the adjusted combination signal comprises effects of a transcapacitive coupling between the first sensor electrode and the second sensor electrode and effects of an absolute capacitive coupling between the second sensor electrode and the input object.

In general, in one aspect, one or more embodiments relate to a capacitive sensing input system. The capacitive sensing input system includes a plurality of sensor electrodes disposed in a sensor electrode pattern, the plurality of sensor electrodes comprising a first sensor electrode and a second sensor electrode. The capacitive sensing input system further includes a sensor module configured to obtain an initial combination signal using initial sensor settings. The capacitive sensing input system also includes a determination module configured to make a determination that a low ground mass (LGM) condition associated with the capacitive sensing input system exists in the initial combination signal, and based on the determination determine adjusted sensor settings. The sensor module is further configured to obtain, using the first sensor electrode, the second sensor electrode, and the adjusted sensor settings, an adjusted combination signal, wherein the adjusted combination signal comprises effects of a transcapacitive coupling between the first sensor electrode and the second sensor electrode and effects of an absolute capacitive coupling between the second sensor electrode and the input object. The determination module is further configured to obtain, using the adjusted combination signal, object information for one or more input objects in a sensing region of the capacitive sensing input system.

In general, in one aspect, one or more embodiments relate to a method of capacitive sensing. The method includes making a determination that a low ground mass (LGM) condition associated with an input device exists in an initial combination signal obtained from a sensor module using initial sensor settings, and based on the determination: determine adjusted sensor settings; obtain an adjusted combination signal, using the adjusted sensor settings; obtain, using the adjusted combination signal, object information for one or more input objects in a sensing region of the input device; generate, using a first sensor electrode, a second sensor electrode, and the adjusted sensor settings, the adjusted combination signal, wherein the adjusted combination signal comprises effects of a transcapacitive coupling between the first sensor electrode and the second sensor electrode and effects of an absolute capacitive coupling between the second sensor electrode and the input object.

BRIEF DESCRIPTION OF DRAWINGS

The drawings referred to in this Brief Description of Drawings should not be understood as being drawn to scale unless specifically noted. The accompanying drawings, which are incorporated in and form a part of the Description of Embodiments, illustrate various embodiments and, together with the Description of Embodiments, serve to explain principles discussed below, where like designations denote like elements.

FIGS. 7A, 7B, 7C, 7D, 7E, 7F, and 7G show a flow diagram of an example method of capacitive sensing, according to various embodiments.

DESCRIPTION OF EMBODIMENTS

Figure 1:
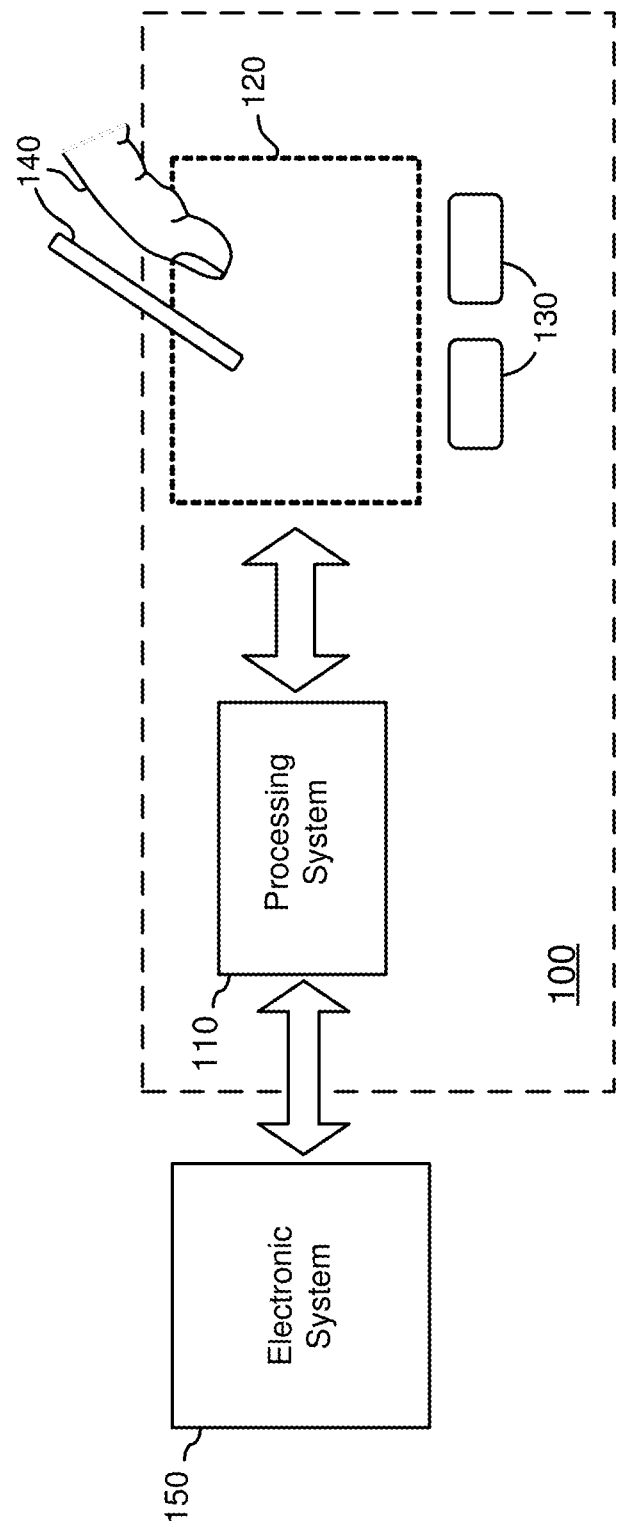
FIG. 1 is a block diagram of an example input device, in accordance with embodiments.

The following Description of Embodiments is merely provided by way of example and not of limitation. Furthermore, there is no intention to be bound by any expressed or implied theory presented in the preceding Background, Summary, or Brief Description of Drawings or the following Description of Embodiments.

Overview of Discussion

Herein, various embodiments are described that provide input devices, processing systems, and methods that facilitate improved usability. In various embodiments described herein, the input device may be a capacitive sensing input device. In general, conventional capacitance sensing measures substantially one type of capacitance at a time with sensor electrodes of a sensor electrode pattern; typically, either an absolute capacitance associated with a sensor electrode or a transcapacitance measured between two non-parallel sensor electrodes. For example, conventionally a capacitive touch implementation may inadvertently measure some aspects of both absolute capacitance and transcapacitance at a point in time when attempting to measure only absolute capacitance or only transcapacitance. Not only are these conventional measurements inadvertent, but they are also not made in a way that they can be independently combined and the effects of each separated for reporting. Herein, systems, methods, and techniques for performing combined capacitive sensing, are disclosed. In general, combined capacitive sensing, as described herein, involves using a sensor electrode pattern to make numerous different types of capacitive measurements simultaneously (e.g., simultaneous measurement of absolute capacitance and one or more types of transcapacitance) such that the effect of user input on the different types of measurements may be used to determine a reported position of an input object or user interface response in response to user input. Further, the adjustment of sensor settings, used for obtaining combination signals under low ground mass (LGM) conditions capacitive sensing is discussed, and methods for obtaining object information under LGM conditions are subsequently described.

Discussion begins with a description of an example input device with which or upon which various embodiments described herein may be implemented. An example sensor electrode pattern is then described. A general description of techniques for combined capacitive sensing with a sensor electrode pattern is provided along with some examples. This is followed by description of an example processing system and some components thereof which may be utilized for combined capacitive sensing. The processing system may be utilized with or as a portion of an input device, such as a capacitive sensing input device. Some more specific examples of combined capacitive sensing are illustrated and described in conjunction with an example sensor electrode pattern. Operation of the example input devices, processing system, and components thereof are then further described in conjunction with description of an example method of combined capacitive sensing.

Example Input Device

Turning now to the figures, FIG. 1 is a block diagram of an exemplary input device 100, in accordance with various embodiments. Input device 100 may be configured to provide input to an electronic system/device 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic systems could be a host or a slave to the input device.

Input device 100 can be implemented as a physical part of an electronic system 150, or can be physically separate from electronic system 150. As appropriate, input device 100 may communicate with parts of the electronic system using any one or more of the following: buses, networks, and other wired or wireless interconnections. Examples include, but are not limited to: Inter-Integrated Circuit (I2C), Serial Peripheral Interface (SPI), Personal System 2 (PS/2), Universal Serial Bus (USB), Bluetooth®, Radio Frequency (RF), and Infrared Data Association (IrDA).

In FIG. 1, input device 100 is shown as a proximity sensor device (also often referred to as a "touchpad" or a "touch sensor device") configured to sense input provided by one or more input objects 140 in a sensing region 120. Example input objects include fingers and styli (passive and active), as shown in FIG. 1.

Sensing region 120 encompasses any space above, around, in and/or near input device 100, in which input device 100 is able to detect user input (e.g., user input provided by one or more input objects 140). The sizes, shapes, and locations of particular sensing regions may vary widely from embodiment to embodiment. In some embodiments, sensing region 120 extends from a surface of input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that includes no contact with any surfaces of input device 100, contact with an input surface (e.g., a touch surface) of input device 100, contact with an input surface of input device 100 coupled with some amount of applied force or pressure, and/or a combination thereof. In various embodiments, input surfaces may be provided by surfaces of casings within which the sensor electrodes reside, by face sheets applied over the sensor electrodes or any casings, transparent lenses over a touch screen display, etc. In some embodiments, sensing region 120 has a rectangular shape when projected on to an input surface of input device 100.

Input device 100 may utilize any combination of sensor components and sensing technologies to detect user input in sensing region 120. Input device 100 includes one or more sensing elements for detecting user input. As a non-limiting example, input device 100 may use capacitive techniques.

Some implementations are configured to provide images that span one, two, three, or higher dimensional spaces. Some implementations are configured to provide projections of input along particular axes or planes.

In some capacitive implementations of input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. In one embodiment, the capacitive coupling between the sensor electrodes and input objects may be combined with the effects of the input on coupling between sensor electrodes to estimate the total coupling of the user to the reference voltage and/or to estimate low ground mass (LGM).

Some capacitive implementations utilize "mutual capacitance" (also referred to herein as "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). In some embodiments, a transcapacitance is measured between a transmitter electrode and a receiver that cross one another. In some embodiments, a transcapacitive measurement is made between a transmitter electrode and a receiver electrode which do not cross one another. Collectively transmitters and receivers may be referred to as sensor electrodes or sensor elements. Transmitter sensor electrodes may be modulated relative to a reference voltage (e.g., system ground, a stationary voltage potential, or a modulated voltage signal) to transmit transmitter signals. Receiver sensor electrodes may be coupled with the reference voltage to facilitate receipt of resulting signals. A resulting signal may include effect(s) corresponding to one or more transmitter signals, and/or to one or more sources of environmental interference (e.g., actively modulated pen or other electromagnetic signals). Sensor electrodes may be dedicated transmitters or receivers, or may be configured to both transmit and receive. In some embodiments, one or more receiver electrodes may be operated to receive a resulting signal when no transmitter electrodes are transmitting (e.g., the transmitters are disabled). In this manner, the resulting signal represents noise detected in the operating environment of sensing region 120.

In FIG. 1, a processing system 110 is shown as part of input device 100. Processing system 110 is configured to operate the hardware of input device 100 to detect input in sensing region 120. Processing system 110 includes parts of or all of one or more integrated circuits (ICs) and/or other circuitry components. For example, a processing system may include transmitter circuitry configured to transmit signals with transmitter sensor electrodes, and/or receiver circuitry configured to receive signals with receiver sensor electrodes. Such transmitter circuitry may include one or more analog components such as amplifiers (e.g., buffers) which are used to drive transmitter signals onto sensor electrodes. Such receiver circuitry may include one or more analog components such as amplifiers which are used to receive and amplify signals from the sensor electrodes. In some embodiments, some analog components are shared between transmitter circuitry and receiver circuitry. In various embodiments, one or more analog components of the transmitter and/or receiver circuitry may be used for both transcapacitive and absolute capacitive sensing. In some embodiments, processing system 110 also includes electronically-readable instructions, such as firmware code, software code, and/or the like. In some embodiments, components composing processing system 110 are located together, such as near sensing element(s) of input device 100. In other embodiments, components of processing system 110 are physically separate with one or more components close to sensing element(s) of input device 100, and one or more components elsewhere. For example, input device 100 may be a peripheral coupled to a desktop computer, and processing system 110 may include software configured to run on a central processing unit of the desktop computer and one or more ICs (perhaps with associated firmware) separate from the central processing unit. As another example, input device 100 may be physically integrated in a phone, and processing system 110 may include circuits and firmware that are part of a main processor of the phone. In some embodiments, processing system 110 is dedicated to implementing input device 100. In other embodiments, processing system 110 also performs other functions, such as operating display screens, containing a display buffer driving haptic actuators, etc.

Processing system 110 may be implemented as a set of modules that handle different functions of processing system 110. Each module may include circuitry that is a part of processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules may include sensor modules configured to operate sensing element(s) to detect input, determination modules configured to determine absolute capacitance and positions of any inputs objects therefrom, determination modules configured to determine changes in transcapacitance and positions of any input objects therefrom, to combine changes in transcapacitance and absolute capacitance to determine positions of any input objects therefrom, and/or to determine interference or actively modulated user inputs and determine their user input state (e.g., excessive noise, hover, contact force, button press etc.), identification modules configured to identify gestures such as mode changing gestures, and mode changing modules for changing operation modes.

In some embodiments, processing system 110 responds to user input (or lack of user input) in sensing region 120 directly by causing one or more actions. Example actions include changing operation modes, as well as GUI actions such as cursor movement, selection, menu navigation, and other functions. In some embodiments, processing system 110 provides information about the input (or lack of input) to some part of the electronic system (e.g., to a central processing system of the electronic system that is separate from processing system 110, if such a separate central processing system exists). In some embodiments, some part of the electronic system processes information received from processing system 110 to act on user input, such as to facilitate a full range of actions, including mode changing actions and GUI actions.

For example, in some embodiments, processing system 110 operates the sensing element(s) of input device 100 to produce electrical signals indicative of input (or lack of input) in sensing region 120. Processing system 110 may perform any appropriate amount of processing on the electrical signals in producing the information provided to the electronic system. For example, processing system 110 may digitize analog electrical signals obtained from the sensor electrodes. As another example, processing system 110 may perform filtering or other signal conditioning. As yet another example, processing system 110 may subtract or otherwise account for a baseline, such that the information reflects a difference between the electrical signals and the baseline. As yet further examples, processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information.

Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, input device 100 is implemented with additional input components that are operated by processing system 110 or by some other processing system. These additional input components may provide redundant functionality for input in sensing region 120, or some other functionality. FIG. 1 shows buttons 130 near sensing region 120 that can be used to facilitate selection of items using input device 100. Other types of additional input components include sliders, balls, wheels, switches, and the like. Conversely, in some embodiments, input device 100 may be implemented with no other input components.

In some embodiments, input device 100 may be a touch screen, and sensing region 120 overlaps at least part of an active area of a display screen. For example, input device 100 may include substantially transparent (including but not limited to opaque metal meshes) sensor electrodes overlaying the display screen and provide a touch screen interface for the associated electronic system 150. A metal mesh over a display may be designed to minimize visible Moire' patterns with the subpixel patterns below, and to minimize reflection of light from above. In one embodiment the mesh may be patterned to substantially surround each subpixel while allowing sufficient (e.g. greater than +/−75 degree) and patterned to segment the electrodes (e.g. into orthogonal X and Y axis diamond electrodes). The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. Input device 100 and the display screen may share physical elements. For example, some embodiments may utilize some of the same electrical components for displaying and sensing. As another example, the display screen may be operated in part or in total by processing system 110.

It should be understood that while many embodiments are described in the context of a fully functioning apparatus, the mechanisms are capable of being distributed as a program product (e.g., software) in a variety of forms. For example, the mechanisms that are described may be implemented and distributed as a software program on information bearing media that are readable by electronic processors (e.g., non-transitory computer-readable and/or recordable/writable information bearing media readable by processing system 110). Additionally, the embodiments apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other tangible storage technology.

Figure 2A:
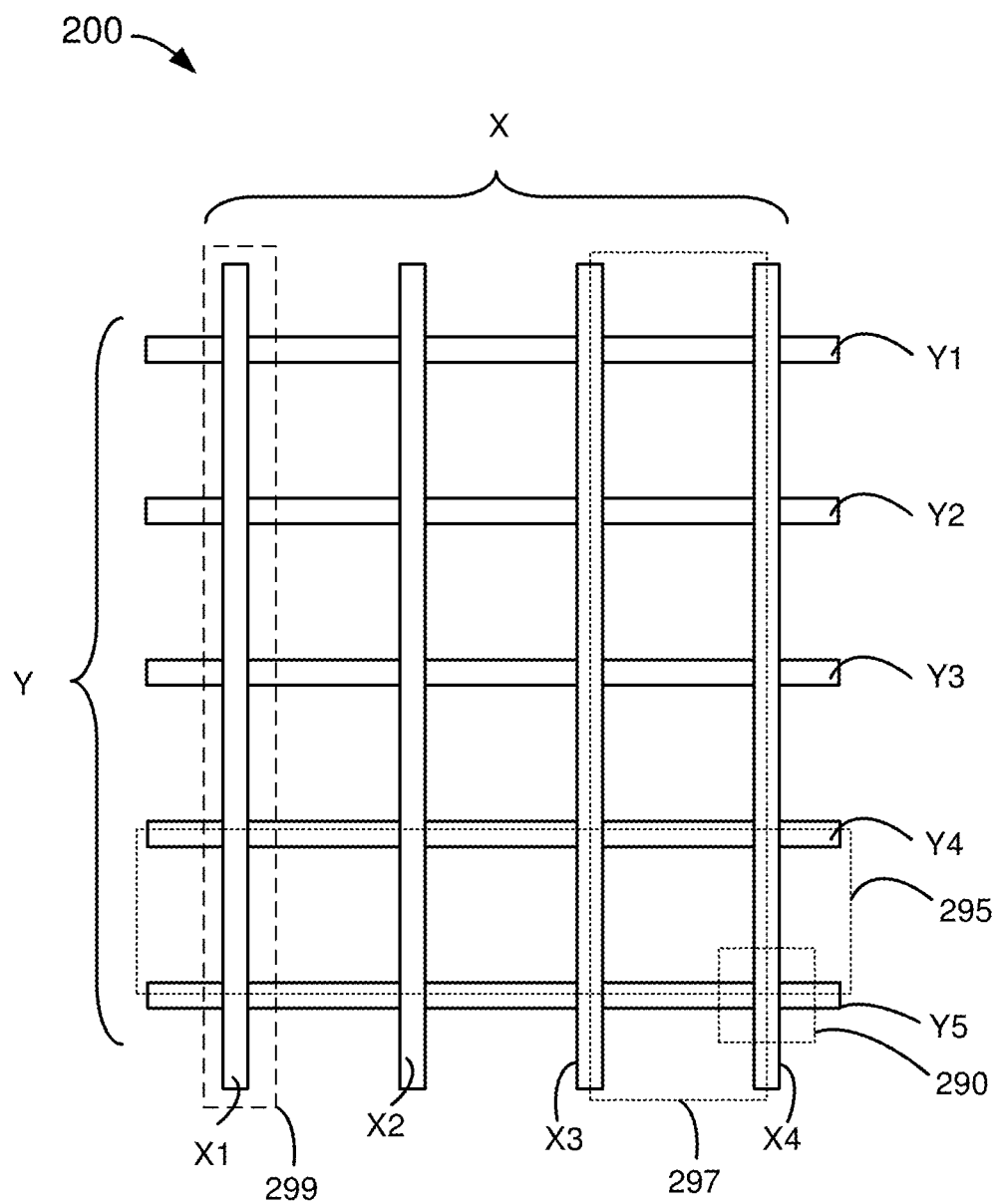
FIG. 2A shows a portion of an example sensor electrode pattern which may be utilized in a sensor to generate all or part of the sensing region of an input device, such as a touch screen, according to some embodiments.

FIG. 2A shows a portion of an example sensor electrode pattern 200 which may be utilized in a sensor to generate all or part of the sensing region of input device 100, according to various embodiments. Input device 100 is configured as a capacitive sensing input device when utilized with a capacitive sensor electrode pattern. For purposes of clarity of illustration and description, a non-limiting simple rectangular sensor electrode pattern 200 with a first multitude of sensor electrodes X and a second multitude of sensor electrodes Y is illustrated. Although the labels X and Y are utilized and FIG. 2A illustrates that the X and Y sensor electrode subsets are substantially orthogonal to one another, an orthogonal relationship between the crossing first and second subsets of sensor electrodes is not required. In one embodiment, the sensor electrodes X and Y may be arranged on different sides of the same substrate. For example, each of the first multitude X and second multitude of sensor electrode may be disposed on one of the surfaces of a substrate. In one such an embodiment, sensor electrodes X are disposed on a first side of a substrate, while sensor electrodes Y are disposed on an opposing side of the substrate. In other embodiments, the sensor electrodes may be arranged on different substrates. For example, each of the each of the first and second multitude of sensor electrode(s) may be disposed on surfaces of separate substrates which may be adhered together. In another embodiment, the sensor electrodes are all located on the same side or surface of a common substrate. In one example, a first multitude of the sensor electrodes include jumpers in regions where the first multitude of sensor electrodes crossover the second multitude of sensor electrodes, where the jumpers are insulated from the second multitude of sensor electrodes. In one or more embodiments, the sensor electrodes may include at least one display electrode configured for display updating and capacitive sensing. The display electrode may be selected from a list including, but not limited to, a segment of a segmented Vcom electrode, a source electrode, a gate electrode, a cathode electrode, and an anode electrode.

The first multitude of sensor electrodes may extend in a first direction, and the second multitude of sensor electrodes may extend in a second direction. The second direction may be similar to or different from the first direction. For example, the second direction may be parallel with, perpendicular to, or diagonal to the first direction. Further, the sensor electrodes may each have the same size or shape or differing size and shapes. In one embodiment, the first multitude of sensor electrodes may be larger (larger surface area) than the second multitude of sensor electrodes. In other embodiments, the first multitude and second multitude of sensor electrodes may have a similar size and/or shape. Thus, the size and/or shape of the one or more of the sensor electrodes may be different than the size and/or shape of another one or more of the sensor electrodes. Nonetheless, each of the sensor electrodes may be formed into any desired shape on their respective substrates.

In other embodiments, one or more of sensor electrodes are disposed on the same side or surface of the common substrate and are isolated from each other in the sensing region 120.

Figure 2B:
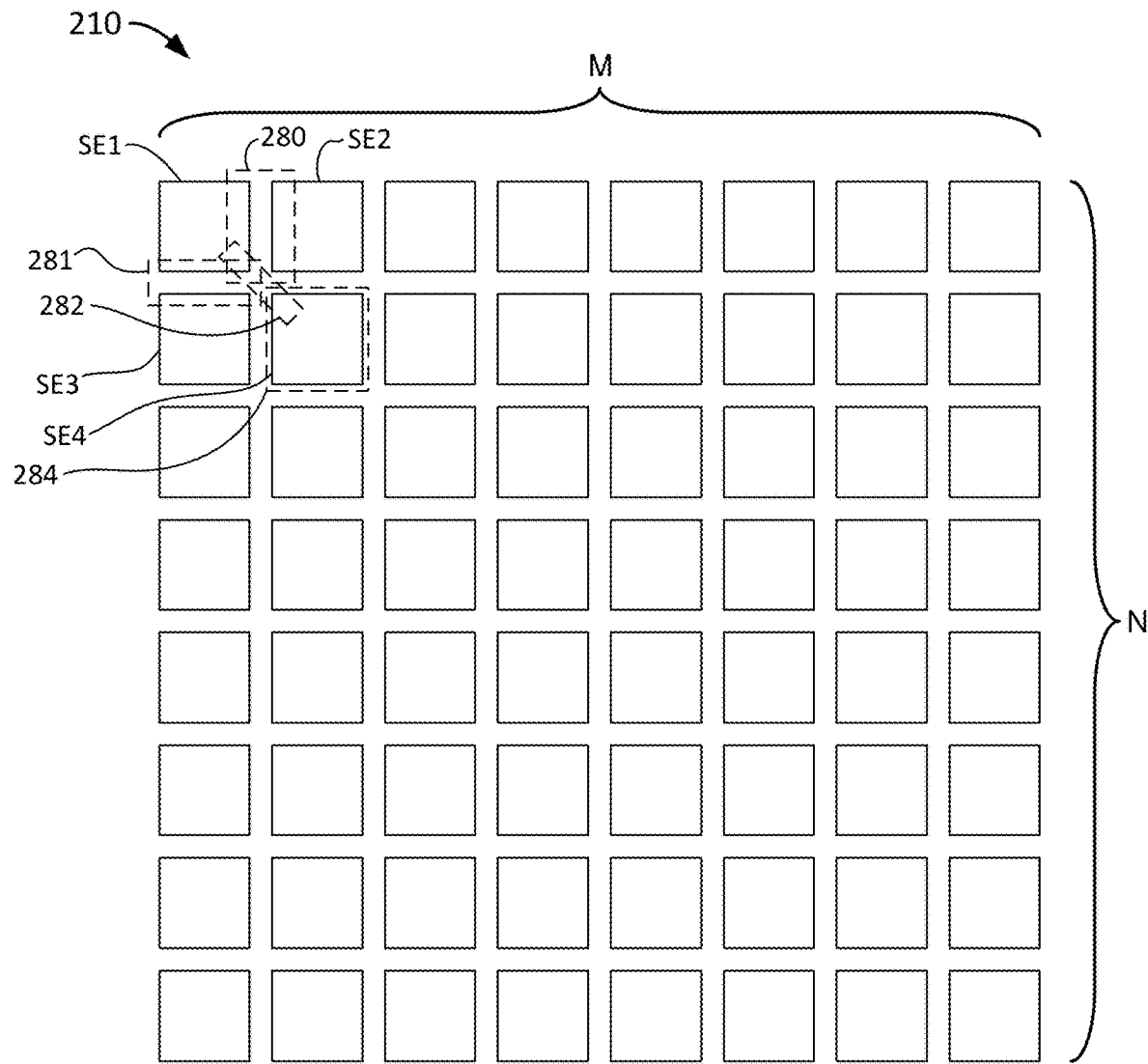
FIG. 2B illustrates an example matrix array of sensor electrodes, according to various embodiments.

FIG. 2B illustrates an example matrix array of sensor electrodes, according to various embodiments. As illustrated in FIG. 2B, the sensor electrodes 210 may be disposed in a matrix array where each sensor electrode may be referred to as a matrix sensor electrode. In one embodiment, each sensor electrode of sensor electrodes is substantially similar size and/or shape. In one embodiment, one or more of sensor electrodes of the matrix array of sensor electrodes may vary in at least one of size and shape. Each sensor electrode of the matrix array may correspond to a pixel of a capacitive image. Further, two or more sensor electrodes of the matrix array may correspond to a pixel of a capacitive image. In various embodiments, each sensor electrode of the matrix array may be coupled a separate capacitive routing trace of a multitude of capacitive routing traces. In various embodiments, the sensor electrodes 210 include one or more grid electrodes disposed between at least two sensor electrodes of sensor electrodes. The grid electrode and at least one sensor electrode may be disposed on a common side of a substrate, different sides of a common substrate and/or on different substrates. In one or more embodiments, the sensor electrodes and the grid electrode(s) may encompass an entire voltage electrode of a display device. The voltage electrode may be selected from a list including, but not limited to, a Vcom electrode, a segment of a segmented Vcom electrode, a source electrode, a gate electrode, a cathode electrode, and an anode electrode. Although the sensor electrodes may be electrically isolated on the substrate, the electrodes may be coupled together outside of the sensing region 120—e.g., in a connection region. In one embodiment, a floating electrode may be disposed between the grid electrode and the sensor electrodes. In one particular embodiment, the floating electrode, the grid electrode and the sensor electrode include the entirety of a common electrode of a display device. Each sensor electrode may be individually coupled to the processing system or coupled to the processing system through one or more multiplexers or switching mechanisms.

The illustrated sensor electrode pattern in FIG. 2A is made up of a multitude of sensor electrodes X (X1, X2, X3, X4) which may be used as both transmitter electrodes and receiver electrodes and a multitude of sensor electrodes Y (Y1, Y2, Y3, Y5) which may be used as both transmitter electrodes and receiver electrodes. Sensor electrodes X and Y overlay one another in an orthogonal arrangement, in this example. It is appreciated that in a crossing sensor electrode pattern, such as the illustrated example of FIG. 2A, some form of insulating material or substrate is typically disposed between sensor electrodes Y and X. For purposes of clarity, depictions of these substrates and insulators have been omitted herein.

In the illustrated example of FIG. 2A, capacitive pixels may be measured via transcapacitive sensing. For example, capacitive pixels may be located at regions where transmitter and receiver electrodes interact. The pixels may have a variety of shapes, depending on the nature of the interaction. In the illustrated example, capacitive pixels are located where transmitter and receiver electrodes overlap one another. Capacitive coupling 290 illustrates one of the capacitive couplings generated by sensor electrode pattern 200 during transcapacitive sensing with sensor electrode Y5 as a transmitter electrode and sensor electrode X4 as a receiver electrode or with sensor electrode X4 as a transmitter electrode and sensor electrode Y5 as a receiver electrode. Capacitive coupling 295 illustrates one of the capacitive couplings generated by sensor electrode pattern 200 during transcapacitive sensing with sensor electrode Y5 as a transmitter electrode and sensor electrode Y4 as a receiver electrode or with sensor electrode Y4 as a transmitter electrode and sensor electrode Y5 as a receiver electrode. Capacitive coupling 297 illustrates one of the capacitive couplings generated by sensor electrode pattern 200 during transcapacitive sensing with sensor electrode X4 as a transmitter electrode and sensor electrode Y3 as a receiver electrode or with sensor electrode X3 as a transmitter electrode and sensor electrode X4 as a receiver electrode. When accomplishing transcapacitive measurements, the capacitive couplings, are areas of localized capacitive coupling between sensor electrodes. The capacitive coupling between sensor electrodes change with the proximity and motion of input objects in the sensing region associated with sensor electrodes. In some instances, areas of capacitive coupling such as 290, 295, and 297 may be referred to as capacitive pixels. It should be noted that the different types of capacitive couplings 290, 295, 297 have different shapes, sizes, and or orientations from one another due to the particular nature of the interactions. As another example, absolute capacitive couplings may increase where the area of overlap between a sensor electrode and a user input depending on the series coupling of the user through a voltage reference (e.g., system ground) from which the respective receiver is modulated. As one example, dashed box 299 represents an area of absolute capacitive coupling which may be associated with sensor electrode X1; other sensor electrodes similar have areas of absolute capacitive coupling. As a further example, the absolute capacitive series couplings may also include the effect of user coupling to other transmitter electrodes in parallel to the coupling to the reference voltage.

In the illustrated example of FIG. 2B, capacitive pixels may be measured via transcapacitive sensing. For example, capacitive pixels may be located at regions where transmitter and receiver electrodes interact. In the illustrated example, capacitive pixels are located where transmitter and receiver electrodes are coupled to one another. For example, capacitive coupling 280 illustrates one of the capacitive couplings generated by sensor electrode pattern 210 during transcapacitive sensing with sensor electrode SE1 as a transmitter electrode and sensor electrode SE2 as a receiver electrode or with sensor electrode SE1 as a transmitter electrode and sensor electrode SE2 as a receiver electrode. Capacitive coupling 281 illustrates one of the capacitive couplings generated by sensor electrode pattern 210 during transcapacitive sensing with sensor electrode SE1 as a transmitter electrode and sensor electrode SE3 as a receiver electrode or with sensor electrode SE3 as a transmitter electrode and sensor electrode SE1 as a receiver electrode. Capacitive coupling 282 illustrates one of the capacitive couplings generated by sensor electrode pattern 210 during transcapacitive sensing with sensor electrode SE1 as a transmitter electrode and sensor electrode SE4 as a receiver electrode or with sensor electrode SE4 as a transmitter electrode and sensor electrode SE1 as a receiver electrode. When accomplishing transcapacitive measurements, the capacitive couplings, are areas of localized capacitive coupling between sensor electrodes. The capacitive coupling between sensor electrodes changes with the proximity and motion of input objects in the sensing region associated with sensor electrodes. As one example, dashed box 284 represents an area of absolute capacitive coupling which may be associated with sensor electrode SE4; other sensor electrodes in sensor electrode pattern 210 similar have areas of absolute capacitive coupling. The absolute capacitance of any one or more of the sensor electrodes in sensor electrode pattern 210 may also be measured. For purposes of brevity and clarity, the embodiments discussed in FIGS. 3A-7G are described using the example sensor electrode pattern 200 of FIG. 2A. It should be appreciated by one of skill in the art that the embodiments described in FIGS. 3A-7G can similarly be implemented using a variety of other sensor electrode patterns, including sensor electrode pattern 210 of FIG. 2B.

In some embodiments, sensor electrode pattern 200 is "scanned" to determine these capacitive couplings. That is, the transmitter electrodes are driven to transmit transmitter signals. Transmitters may be operated such that one transmitter electrode transmits at one time, or multiple transmitter electrodes transmit at the same time. Where multiple transmitter electrodes transmit simultaneously, these multiple transmitter electrodes may transmit the same transmitter signal and produce an effectively larger transmitter electrode, or these multiple transmitter electrodes may transmit different transmitter signals. For example, multiple transmitter electrodes may transmit different transmitter signals according to one or more coding schemes that enable their combined effects on the resulting signals of receiver electrodes to be independently determined based on the multiple results of multiple independent codes. In one embodiment, a first sensor electrode may be driven with a first transmitter signal based on a first code of a multitude of distinct digital codes and a second sensor electrode may be driven with a second transmitter signal based on a second code of the multitude of distinct digital codes, where the first code may be orthogonal to the second code. With regard to FIG. 2B, the sensor electrodes may be driven and received with such that at least two sensor electrodes may be simultaneously driven. In one or more embodiments, each of the sensor electrodes may be simultaneously driven. In such an embodiment, each sensor electrode may be driven with a transmitter signal based on a different one of a multitude of orthogonal digital codes. Further, the sensor electrodes may be driven such that a first at least one sensor electrode is driven differently that a second at least sensor electrode. In one or more embodiments, the sensor electrodes are driven such that along each row and column alternating sensor electrodes are driven differently.

The receiver electrodes may be operated singly or in multiples to acquire resulting signals. The resulting signals may be used to determine measurements of the capacitive couplings at the capacitive pixels. Note that the receiver signals may also be multiplexed such that multiple electrodes may be measured with a single receiver (e.g., analog front end or "AFE"). Furthermore, the receiver multiplexer may be implemented such that the receiver is simultaneously coupled to and simultaneously receives resulting signals from multiple sensor electrodes. In such implementations, the resulting signals include coded results from the multiple sensor electrodes. Note in various embodiments, that multiple "absolute capacitance" electrodes may be driven simultaneously with the same modulation relative to a reference voltage and such that they are guarding each other, or some may be driven relative to each other modulated relative to a system reference voltage such that they measure both a transcapacitive and an absolute capacitive signal simultaneously.

A set of measurements from the capacitive couplings or pixels form a "capacitive image" (also "capacitive frame") representative of the transcapacitive couplings a. For example, a capacitive image may be made up of a set of capacitive pixels, such as capacitive coupling 290. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region. Also, in various embodiments, a "capacitive image" may be formed by absolute capacitive measurements of a matrix array of sensor electrodes (e.g., sensor electrode pattern 210 of FIG. 2B). In such embodiments, sensor electrodes may be operated for absolute capacitive sensing depending on the multiplexer settings. For example, the sensor electrodes may be grouped in to rows, columns and/or other combinations of sensor electrodes.

A set of measurements from the capacitive coupling/pixels along one axis may be taken to form a "transcapacitive profile" (also "profile frame") representative of the capacitive couplings at the capacitive couplings/pixels between parallel electrodes on an axis (e.g., electrodes X or Y). For example, a transcapacitive profile may be made up from a set of horizontal capacitive pixels, such as capacitive coupling/pixel 295, or from a set of vertical pixels, such as capacitive coupling/pixel 297. Multiple transcapacitive profiles along one or more axes may be acquired over multiple time periods, and differences between them used to derive information about input in the sensing region. For example, successive transcapacitive profiles acquired over successive periods of time for an axis can be used to track the motion(s) of one or more input objects entering, exiting, and within the sensing region. Alternately, a set of measurements from the capacitive coupling along an axis may be taken from an "absolute capacitive profile" (also called "ABS profile") representative of the capacitive couplings between the parallel electrodes on an axis and the series capacitance from the user input through the coupling to the reference electrode which the absolute receivers are modulated.

In some embodiments, one or more sensor electrodes Y or X may be operated to perform absolute capacitive sensing at a particular instance of time. For example, sensor electrode X1 may be charged by driving a modulated signal onto sensor electrode X1, and then the capacitance of receiver electrode X1 to system reference voltage including the coupling through the user input may be measured. In such an embodiment, an input object 140 interacting with sensor electrode X1 alters the electric field near sensor electrode X1, thus changing the measured capacitive coupling. In this same manner, a multitude of sensor electrodes X and/or sensor electrodes Y may be used to measure absolute capacitance at different times or at times that overlap partially or completely.

As will be described herein, in some embodiments, combined sensing can be performed by driving a sensing signal onto a sensor electrode (e.g., sensor electrode X1) for the purposes of measuring absolute capacitance with that sensor electrode and, simultaneously with the driving of that sensor electrode, other sensor electrodes that cross and do not cross that sensor electrode (e.g., sensor electrodes Y that cross sensor electrode X1 and one or more other sensor electrodes X which do not cross sensor electrode X1) may be used as receivers to obtain transcapacitive measurements between themselves and the driven sensor electrode.

Figure 3A:
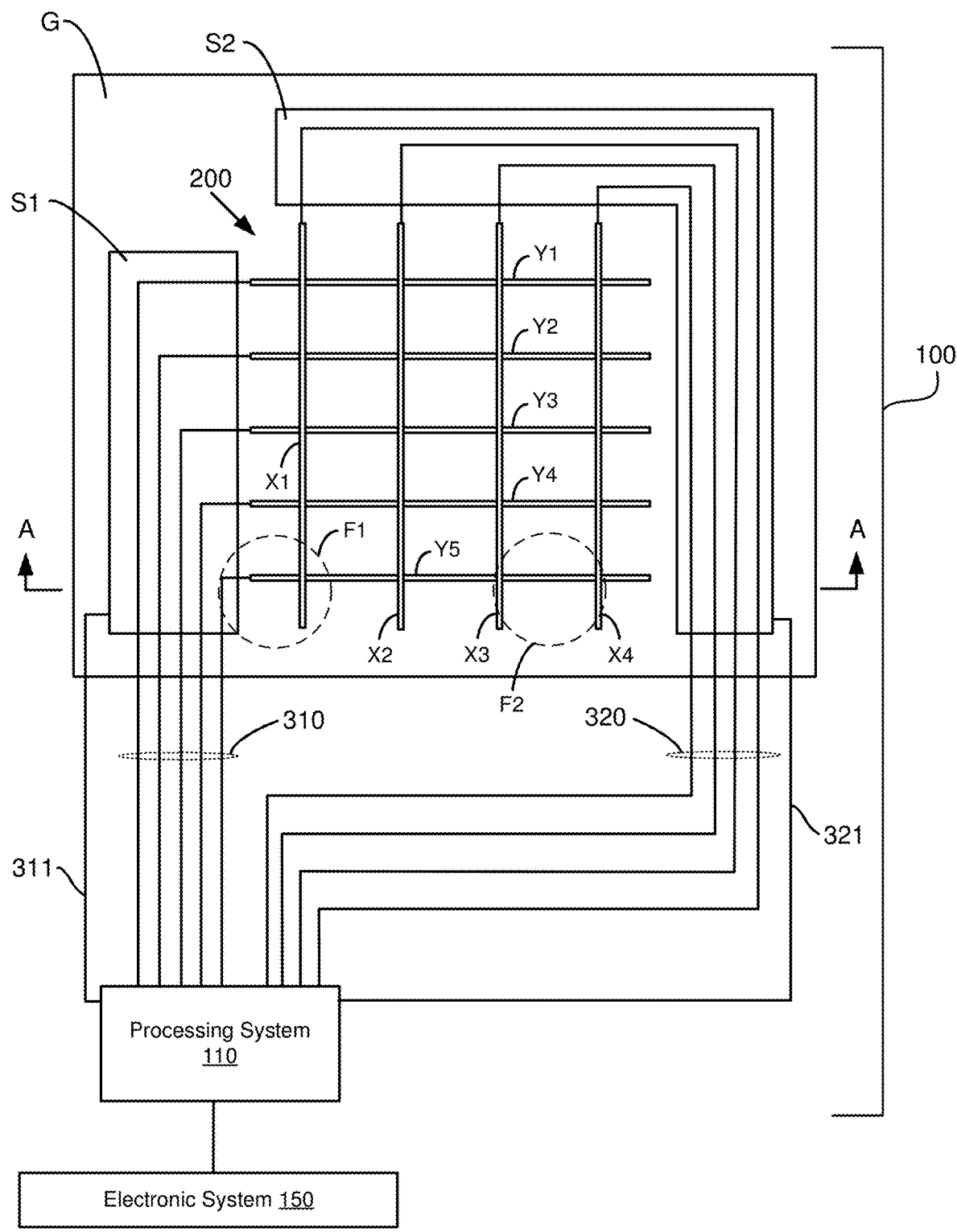
FIG. 3A shows more detailed block diagram of the input device of FIG. 1, according to an embodiment.

FIG. 3A shows a more detailed block diagram of the input device 100 of FIG. 1, according to an embodiment. By way of example and not of limitation, FIG. 3A depicts and describes a crossing sensor electrode pattern as shown in FIG. 2A; however, it should be appreciated that the description and techniques presented with respect to FIG. 3A may similarly be applied to the sensor electrode pattern 210 of FIG. 2B. In FIG. 3A capacitive sensing input device 100, in the illustrated embodiment, includes sensor electrodes of sensor electrode pattern 200. It should be appreciated that for purposes of clarity some components such as substrates, insulating material, and routing traces are omitted so as not to obscure the depicted portions. Sensor electrodes X and Y or sensor electrode pattern 200 are shown coupled by routing traces to processing system 110. For example, routing traces 310 couple sensor electrodes Y1, Y2, Y3, Y4, and Y5 with processing system 110, and routing traces 320 couple sensor electrodes X1, X2, X3, and X4 with processing system 110. Sensor electrode pattern 200 is disposed above a conductive system electrode G. The system electrode may be driven with a system reference, which may also be referred to as a system ground. In one or more embodiments, the system electrode G may be part of the housing of the input device, or the battery of the input device. In one or more embodiments an optional electrode B (depicted in FIG. 3B but not in FIG. 3A) may be disposed between the sensor electrodes and system ground electrode. Electrode B may be driven with a shielding signal, which may be a substantially constant voltage or a varying voltage (i.e., guard signal).

Electrode S1 overlaps at least a portion of routing traces 310, and may be used to shield signals on these routing traces. Electrode S1 is coupled with processing system 110 by routing trace 311 and may be held at a constant voltage potential or modulated by processing system 110. An electrode S2 overlaps at least a portion of routing traces 320, and may be used to shield signals on these routing traces. Electrode S2 is coupled with processing system 110 by routing trace 321 and may be held at a constant voltage potential or modulated by processing system 110. As illustrated, in some embodiments, input device 100 is communicatively coupled with electronic system 150. In one embodiment, the constant voltage potential may be the system reference. In other embodiments, the constant voltage potential may be any substantially constant voltage.

In one embodiment, change in the position of an input object, such as finger F1, may also change the capacitances $C_{Y5X1}$ or $C_{Y5X3}$. Moreover, another input object, such as finger F2, may be further away from the sensor electrodes than finger F1 and may have no or very minimal substantially effect on $C_{X3F2}$, $C_{X4F2}$, and $C_{X4F2}$.

Figure 3B:
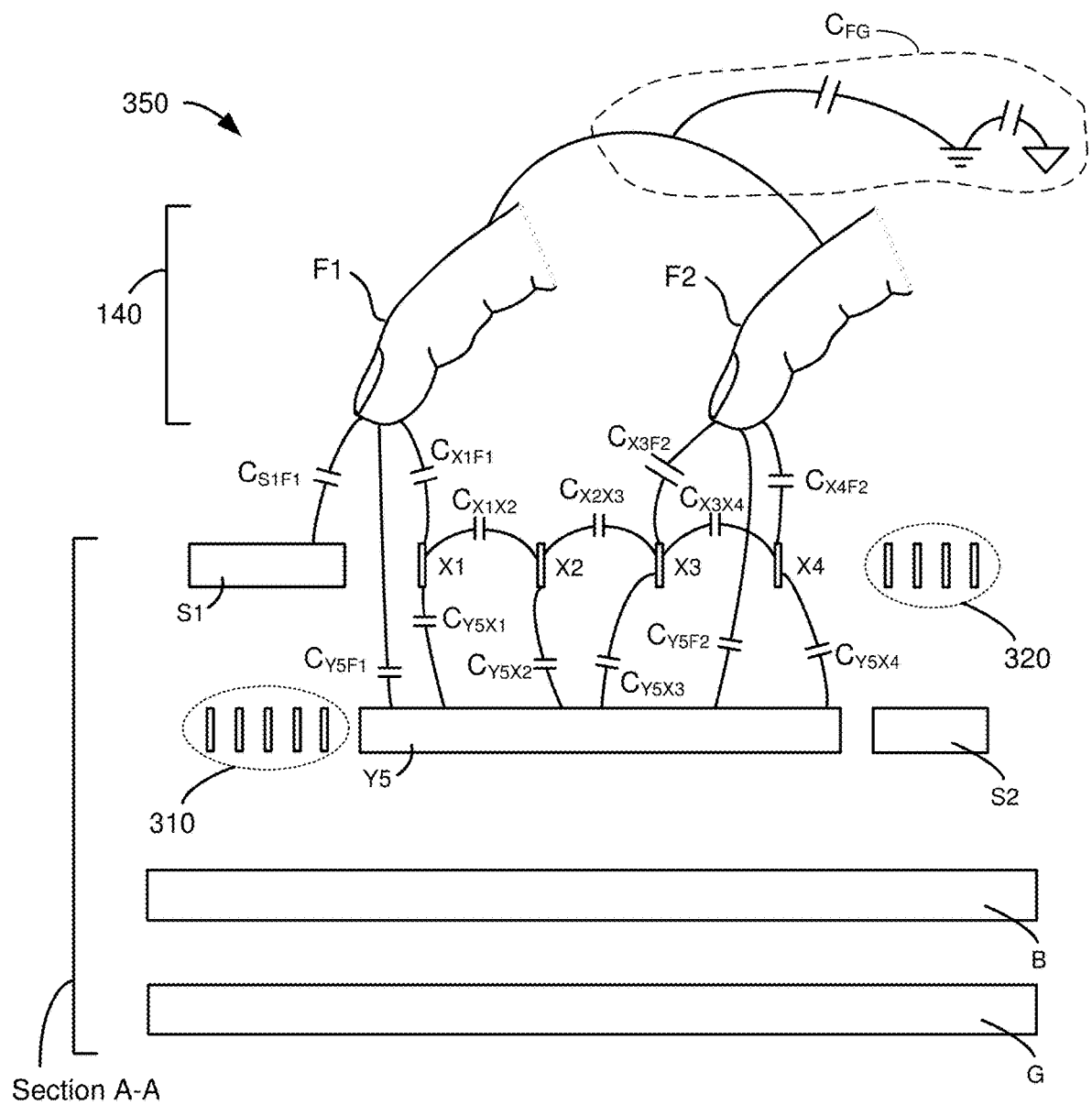
FIG. 3B shows an exploded side sectional view of a portion of the input device of FIG. 3A, according to an embodiment.

In FIG. 3A, Arrows A, represent the location and direction of a front side-sectional view that is illustrated in FIG. 3B. Additionally, in FIG. 3A, circle F1 represents the interaction area of a finger, F1, that is illustrated in FIG. 3B; while circle F2 represents the interaction are of a finger, F2, that is also illustrated in FIG. 3B.

FIG. 3B shows an exploded side sectional view A-A of a portion of the input device of FIG. 3A, according to an embodiment. As with FIG. 3A, portions such as substrates, insulators, and routing traces have been omitted for the purposes of clarity so as not to obscure the depicted portions. In the illustrated embodiment, it can be seen that electrode S1 is disposed in the same layer as sensor electrodes X, and electrode S2 is disposed in the same layer as sensor electrodes Y. In other embodiments, sensor electrodes S1 and S2 may be disposed in the same layer as one another or in different layers than depicted; for example, electrode S2 may be disposed above routing traces 320 rather than below as depicted, and sensor electrode S1 may be disposed below routing traces 310 rather than above as depicted. In addition to section A-A, two input objects 140 in the form of a first finger, F1, and a second finger, F2, are shown along with a variety of capacitive couplings within and to the sensor electrodes X and Y of sensor electrode pattern 200.

With an array of sensing electrodes, such as sensor electrode pattern 200, which are arranged in a crossing array where two sets of sensor electrodes (sensor electrodes X and sensor electrodes Y) are roughly parallel within the set, the sets may effectively couple together in a set of capacitive combinations larger than that within either set separately (e.g., the electrode sets may be roughly perpendicular between them). Consider an example where there are M sensor electrodes in the set of X sensor electrodes and N sensor electrodes in the set of Y electrodes. Where the sets of X and Y sensor electrodes are roughly orthogonal, in areas where they extend to cover each other there will be capacitances described by transcapacitance between the sets (e.g., $C_{X1Y2}$ and $C_{Y2X1}$ for a total number of crossings of up to 2*(M*N)). There will also be capacitances described by absolute capacitance up to M+N=P) from each of the electrodes to a chassis ground (e.g., $C_{X1X1}$ or $C_{Y2Y2}$). Further within the sets there will be capacitances described by transcapacitance, which are within the parallel sets (e.g., up to M*(M−1) and N*(N−1) additional capacitances like $C_{X1X2}$ and $C_{Y1Y2}$).

In general, the number of set-to-set transcapacitances, intra-set transcapacitances, and absolute capacitances, will be a matrix of all capacitances between each of the sets of electrodes (e.g., $P^2=[M+N]^2$). There may also be other electrodes including relatively stationary (to system ground) shields, or modulated electrodes (e.g., guards) which may minimize uncontrolled capacitive coupling, or others that may interfere randomly or by increasing the required dynamic range of capacitive measurement. In various embodiments, the number of capacitances vary based on the sensor electrode pattern, and in various embodiments, the sensor electrode pattern may be configured to provide a predetermined number of absolute, set-to-set transcapacitances and/or intra-set transcapacitances. For example, with reference to the sensor electrode pattern shown in FIG. 2B, $(N*M)^2$ capacitances may be determined, where N is the number of sensor electrodes disposed along a first axis (e.g., along X axis) and M is the number of sensor electrodes disposed along a second axis (e.g., along Y axis).

The chassis of input device 100 may in turn be coupled to free-space and/or to one or more conductive input objects. Those objects may be effectively AC grounded (to the chassis) either by contact or through free-space, or they may be effectively "floating." Further high (relative to vacuum or air) dielectric objects may also exist and change capacitive couplings of the array of sensor electrodes in sensor electrode pattern 200. For example, the sensitivity of the capacitive measurement of the transcapacitances and the cross coupling of capacitances may be reduced (shielded) or increased (coupled through the sensor electrode) respectively when the capacitive coupling of the chassis with the input object is high or low respectively. In particular this may tend to make simple measurements of the capacitances more difficult in some instances when conventional measurement techniques are employed.

As previously described, the array of sensor electrodes in sensor electrode pattern 200 may include transmitters and receivers, where most generically each of the sensor electrodes may be a transmitter (modulated relative to system ground), a receiver which measures charge (or modulated currents) coupled through the capacitances of transmitters modulated relative to them (e.g., stationary in voltage relative to the chassis ground), or both (e.g., an absolute capacitance sensitive receiver modulated relative to ground which measures that capacitance and also any other relatively modulated electrodes). The sensor electrodes may also be decoupled from low impedance outputs/inputs such that their other couplings dominate and coupling between occur (e.g., reduced shielding/guarding). The capacitances in sensor electrode pattern 200 may then be estimated by measuring the charge to voltage ratio (e.g., measuring charge for a fixed voltage modulation, or measuring voltage for a fixed charge modulation). In some embodiments, when the coupling from an input object to system ground is low, the direct coupling between sensor electrodes can increase (e.g., the intra-set transcapacitance may increase or the increased coupling through the input object may be comparable to the reduced direct coupling between sets). In such embodiments, changes to the electric field due to the input object may be low. This makes conventional estimations of the capacitances (e.g., $C_{X1Y1}$ and $C_{X4Y2}$) based on single measurements of charge versus voltage inaccurate and in some embodiments, it may be indeterminable. However, by correlating multiple measurements, independent estimates of direct coupling capacitances (e.g., similar to those where the input is fully grounded) can be made and input locations based on those corrected estimates.

For example, combined capacitive sensing can be employed by scanning when all electrodes are receivers (e.g., modulating each electrode in sequence while receiving on the others) will generate a P*P matrix (of measured capacitance or demodulated charge) where the total number of electrodes is P=M+N. In the P*P matrix there are two set-to-set capacitive images (since each symmetric capacitance is measured twice, e.g., $C_{X1Y4}$ and $C_{Y4X1}$) so two reports may be generated when all of the electrodes are scanned. Such inter-set capacitive images may also be referred to as transcapacitive images as they are made up of transcapacitive measurements. There are also two pairs of other intra-set transcapacitance profiles (M×M and N×N respectively) and two absolute capacitance profiles (a vector of M and a vector of N). In the case where user input coupling to system ground is known, corrections can be made to the images. However, it is possible for multiple levels of input coupling to be present (e.g., a "floating" coin and a grounded finger) simultaneously. This makes the location of the objects and their introduction and removal difficult to distinguish with a single, conventional measurement of transcapacitance at each crossover location. However, by correlating various capacitance measurements the degree of coupling can be estimated and in various embodiments, it can be locally estimated.

Note that, when performing combined capacitive sensing, the different measurements of both the same symmetric capacitance (though measured at a different time) or of different types of capacitance (e.g., absolute capacitance, set-to-set transcapacitance, and intra-set transcapacitance) may be correlated with each other to better interpret the input signals (e.g., even when they are changing or when the ground coupling of the user is low).

With reference to FIGS. 3A and 3B, the charges transferred by the different capacitances (e.g., absolute capacitances such as $C_{X1F1}$, $C_{X3F2}$, $C_{X4F2}$, $C_{Y5F1}$, $C_{Y5F2}$; set-to-set transcapacitances $C_{Y5X1}$, $C_{Y5X2}$, $C_{Y5X3}$, $C_{Y5X4}$; and intra-set transcapacitances such as $C_{X1X2}$, $C_{X2X3}$) all occur at substantially the same time along with other capacitances (e.g., $C_{F1S1}$, $C_{FG}$, and $C_{F2B}$) but the coupling through input objects can confound the normal (e.g., well-grounded user input) assumptions about their effect simply on transcapacitances collected according conventional sensing techniques. This can lead to bad baselines and Low Ground Mass (LGM) effects that are difficult to disambiguate from moisture or multiple input objects when conventional capacitive sensing techniques are employed. However, when using combined capacitive sensing techniques described herein the coupling of an input object to ground can be determined by either the reduced charge coupling of an object on an absolute profile measurement or by the increased charge coupling on a transcapacitance measurement or a combination of both.

Figure 4:
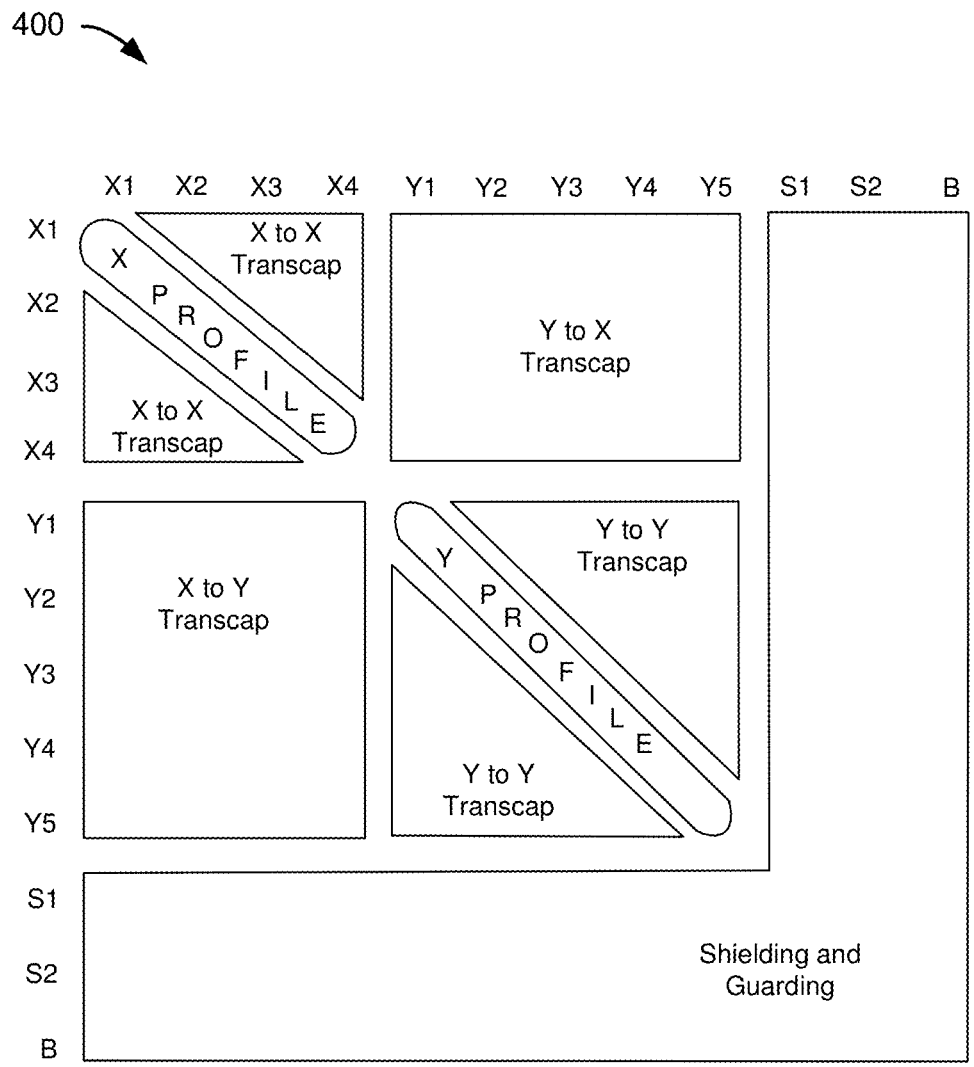
FIG. 4 shows a matrix of capacitances associated with the input device illustrated in FIGS. 3A and 3B, according to an embodiment.

FIG. 4 shows a matrix 400 of capacitances associated with the input device illustrated in FIG. 3A, according to an embodiment. The multiple capacitances illustrated in matrix 400 may be acquired via techniques of combined capacitive sensing, in some embodiments. For example, absolute capacitances such as $C_{X1X1} \ldots C_{X4Y4}$ form an X profile; absolute capacitances such as $C_{Y1Y1} \ldots C_{Y5Y5}$ form a Y profile; set-to-set transcapacitances such as $C_{X1Y1}$ form an X to Y capacitive image; set-to-set transcapacitances such as $C_{Y1X1}$ form an Y to X capacitive image; intra-set transcapacitances such as $C_{X1X2}$ and $C_{X2X1}$ form an X to X transcapacitive profile; intra-set transcapacitances such as $C_{Y1Y2}$ and $C_{Y2Y1}$ form a Y to Y transcapacitive profile; and other capacitances to the shields, guards, and system ground electrode G, such as $C_{F1S1}$ and $C_{FG}$, round out the matrix. In various embodiments, a first sensor electrode is modulated such that its absolute capacitance to ground is measured at the same time that the transcapacitive coupling between the first sensor electrode and proximate sensor electrodes is measured. For example, sensor electrode $X_1$ may be modulated to measure its absolute capacitance $C_{X1F1}$ and to measure the transcapacitive couplings $C_{X1Y1}$, $C_{X1Y5}$, $C_{X1X2}$ and $C_{X1X3}$.

Indeed, various capacitive changes may be correlated differently depending on how well input object(s) is/are coupled to system ground. For example, relatively uncoupled inputs (e.g., from different users) can be separately identified by their intra-set transcapacitive capacitance matrices. In such an example, a first user may be holding the input device while a second user is not; however, other orientations are also possible. The intra-set transcapacitive capacitance effects between separated electrodes is usually also very small so that even in an unknown startup condition a large intra-set transcapacitance between separated sensor electrodes almost certainly indicates a floating conductive object (e.g., moisture, a coin, etc.) that might be ignored and that its effect (e.g., on delta set-to-set transcapacitive) could be ignored when it is removed as well. Alternatively, an effect may be estimated and the estimate removed from data that is reported to a host processor and/or used to calculate reported user inputs. Note that scanning speed to reconstruct the relevant capacitances is taken into account through modeling; this is because any motion of an input object may change the correlated capacitances unless the motion of the input objects is modeled. In some embodiments, interleaved measurements of the capacitances when scanning may aid in reducing such "motion artifacts."

When using the techniques of combined capacitive sensing (described herein) to capture capacitances, the LGM effect can typically be modeled by a set of four capacitances from each input object to the sensor ($C_{X1F1}$, $C_{Y1F1}$, $C_{X1Y1}$, and $C_{FG}$) at each pixel/capacitive coupling that the input object covers. Most input objects are well coupled together (e.g., humans have ~150 pF to free space and ~75 pF series coupling to each other which easily dominate most other capacitive couplings to a sensor) so that the capacitance from a finger to ground (CEG) may often be treated as a single variable mostly independent of the number of simultaneous input objects and nearby transcapacitive pixels/capacitive couplings (e.g., crossovers between electrode sets that are located on a neighboring electrode). Multi-input (e.g., multi-touch) interfaces with an input device are more complex, but these may still be modeled by additional capacitances (e.g., $C_{X4F1}$, $C_{X1F1}$, $C_{Y5F1}$, $C_{Y5F2}$, $C_{X4Y5}$). It is useful to measure at least one of the intra-set transcapacitances (e.g., $C_{X1X4}$ and $C_{Y5Y1}$) in addition to the absolute capacitances such that cross capacitive effects can be detected independently and corrected. Note that for each user input there are three changes in capacitance which are of great interest (the delta capacitance from the X electrodes to the finger, $dC_{XF}$; the delta capacitance from the Y electrodes to the finger, $dC_{YF}$; and the delta capacitance from a transmitting sensor electrode to a receiving sensor electrode, $dC_{TR}$) for each input capacitive pixel and one uncontrolled capacitance $C_{FG}$ associated with the coupling of an input object to the chassis. It should be noted that each additional input capacitive pixel coupling adds three more of these capacitances of interest.

The charge coupling that can be measured (e.g., by a capacitive sensor array such as sensor electrode pattern 200) includes up to 5 capacitive measurements if multiple pixels are covered. Also, for a particular sensor design the ratio of $C_{XF}$ and $C_{YF}$ to $C_{XY}$ can be correlated with a particular $C_{FG}$ and/or coupling between inputs (e.g., for a fully covered capacitive pixel, with a given electrode configuration there is an expected ratio between $dC_{XY}$, $dC_{XF}$, and $dC_{YF}$ for a given $C_{FG}$). Using such correlations between capacitive measurements images of $C_{YS}$ and profiles of $C_{XF}$ and $C_{YF}$ can be reconstructed (e.g., errors due to $C_{FG}$ may be estimated and/or corrected for) in a way that is roughly independent of $C_{FG}$ (e.g., as if it the input is effectively grounded), and/or each input object may be classified by its chassis coupling (e.g., as a floating or grounded object). It is often preferred that "un-grounded" objects are ignored (e.g., water droplets, or coins) while even partially grounded objects (e.g., small fingers) are accurately detected even when they are only partially coupled to the chassis of the sensor. Although, in some embodiments, sensor electrode B may be modulated to estimate the capacitive coupling between sensor electrode B and system ground.

One method of detecting each of the capacitances within the full P matrix is "one hot" scanning where each of the sensor electrodes is modulated in sequence while the others are held relatively stationary (such as at ground, or some fixed or commonly modulated voltage potential). In one implementation the modulated sensor electrode absolute/self capacitance (e.g., coupling to the chassis) may be simultaneously measured such that all electrodes are used as receivers. In this way part, or the entire matrix of capacitances may be measured or scanned independently (although the charge coupling through $C_{FG}$ may require multiple measurements from separate pixels or some correlation dependent on sensor design). In various embodiments, each sensor electrode that is scanned measures one row of array 400 of FIG. 4 while each column represents the measurement by a sensor electrode. By measuring the transcapacitance matrix by scanning electrodes in sequence from the crossing set of electrodes the reduced charge coupling seen when multiple (or long and narrow) objects are placed on a single transmitting electrode since an orthogonal set of electrodes will only overlap the long object at a single location.

In some embodiments, different sensing schemes other than "one hot" scanning can be done to increase the power in various measurements, reduce interference and/or and increase the acquisition rate. For increased signal and interference tolerance each sensor may be modulated as often as possible, in some embodiments. There are possible dynamic range issues if the coupling between adjacent or overlapping sensor electrodes is particularly high, but there may also be opportunities to reduce the charge coupled dynamic range. For example, in some embodiments, some sensor electrodes such as sensor electrodes Y may be longer and or wider, and thus these sensor electrodes may have more $C_G$ back coupled ground capacitance, which limits their dynamic range. In such a case, neighboring electrodes (e.g., $X_1$ and $X_3$) may not be measured when $X_2$ is modulated relative to them. Similarly, in some embodiments, some sensor electrodes such as sensor electrodes X may be shorter and/or narrower, and may be driven to "guard" the others of the sensor electrodes X that are used for transmitting. In various embodiments, only a subset of the simultaneous capacitive measurements may be acquired by the processing system 110. In such embodiments, processing system 110 may only use those sensor electrodes configured to provide the least dynamic range. For example, measured receiver electrodes may be narrower or shorter than modulated transmitter or guarding electrodes, and the receiver electrodes may be spaced (due to their narrowness) at a larger distance to each other. Further, the guarding electrodes may be disposed between the receiver sensor electrode to reduce their intra group transcapacitive coupling dynamic range. In some embodiments, some sensor electrodes that transmit can further reduce the required dynamic range by transitioning farther than the other sensor electrodes (e.g., by being driven with a modulated signal having greater amplitude but being in phase with) and thus subtracting charge that would otherwise need to be supplied by the receivers that are coupled with receiver sensor electrodes to maintain the voltage relative to system ground when the transmitter electrode is modulated. In other embodiments, coded sequences which minimize dynamic range while optimizing independence of measurements and sensing SNR may be used.

Both (or only one) of the sensor electrodes X and the sensor electrodes Y can still be measuring absolute capacitance profiles while transmitting or receiving. In one embodiment, Y may be the preferred shorter and/or narrower and more widely spaced electrodes with X filling space between. For scanning, one or more of the sensor electrodes Y can transition the opposite direction (e.g., 180 degrees out of phase). By swinging in opposite direction from the electrodes X, this increases the voltage difference between the orthogonal sensor electrode sets and thus the Signal to Noise Ratio (SNR) and interference performance of set-to-set transcapacitance, as well as the interference performance of any intra-set transcapacitance measurements within either set. Note, in some embodiments, that if all of the sensor electrodes but the scanning sensor electrode are modulated together they may be measuring absolute capacitance and guarding all other similarly driven electrodes, while only the single scanning electrode may be used to measure transcapacitance between sensor electrodes. Multiple sensor electrodes can also be driven in coded sequences to improve SNR. Where absolute measurements are mixed with the result of other measurements may be interleaved to reduce the effect of temporal variation.

In one embodiment, all of the sensor electrodes in a sensor electrode array (e.g., sensor electrode pattern 200) are modulated in phase. In various embodiments, the amplitudes may vary between axes for the previously mentioned charge subtraction effects to balance the required dynamic range required of the different chassis couplings of X and Y sensor electrode sets). This allows a measurement of the P absolute capacitive measurements (mixed with some transcapacitance if they are not modulated with the same amplitude). This can facilitate detecting inputs at longer distances with lower power for "proximity" and "doze" modes. Then, while almost all of the electrodes are still modulated in phase, a single sensor electrode (or a single sensor electrode on each axis) may be modulated in the opposite phase to independently measure the set-to-set transcapacitive matrix (M*N) and the intra-set transcapacitive capacitive matrix (e.g., M*M or N*N). In one embodiment, neighboring intra-set transcapacitively coupled sensor electrodes may have reduced modulation (e.g., stationary voltage relative to system ground) to reduce the required dynamic range. Once all of the sensor electrodes significantly affected by user input are modulated, enough measurements of charge coupling have been made to distinguish and independently reconstruct grounded, partially grounded, and effectively ungrounded conductive (or high dielectric) objects influencing the input device. These reconstructed images, profiles, and distinguished input types may be used to control user input (e.g., on a touch screen user interface/operating system).

Furthermore, capturing active pen signals (e.g., another transmitter outside the sensor array) can be done in half the time or with half the bandwidth when both axes of sensor electrodes (e.g., sensor electrodes X and sensor electrodes Y) are sensing simultaneously since both profiles can be captured simultaneously. If multiple independent measurements of these profiles are made, then the active input can be further distinguished from the other two types. In this way an additional type of input can be measured substantially simultaneously.

For low voltage high dynamic range receivers, in some embodiments, a "current conveyor" technique may be used to translate the received charge from a receiving sensor electrode. In order to measure absolute/self capacitance a sensor electrode is modulated between at least two voltages. Doing this with a single circuit configuration may impose restrictions on the size of the voltage change (e.g., how close to a particular high or low voltage rail) due to the type of transistor (e.g., n or p channel Field Effect Transistors (FETs)). In one embodiment, to avoid this issue, two current conveyors optimized for different reference voltages with a sensor electrode switched between them may be used. The current conveyors accumulate charge on at least two capacitors for measuring differential or quadrature capacitances (e.g., two or alternately three or four capacitors may be used). This allows for modulating the sensor electrodes near the voltage rails without significantly changing voltages (and charging internal capacitances) on internal nodes of a current conveyor more than is necessary for sensing charge coupled from the sensor electrodes.

Example Processing System

Figure 5:
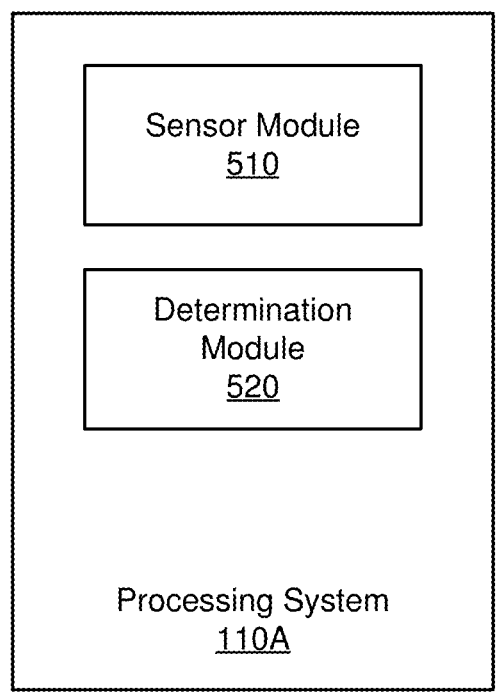
FIG. 5 shows a block diagram of an example processing system, according to an embodiment.

FIG. 5 shows a block diagram of an example processing system 110A, according to an embodiment. Processing system 110A may be utilized with an input device (e.g., in place of processing system 110 as part of input device 100), according to various embodiments. Processing system 110A may be implemented with one or more Application Specific Integrated Circuits (ASICSs), one or more Integrated Circuits (ICs), one or more controllers, or some combination thereof. In one embodiment, processing system 110A is communicatively coupled with a multitude of sensor electrodes that implement a sensing region 120 of an input device 100. In some embodiments, processing system 110A and the input device 100, of which it is a part, may be disposed in or communicatively coupled with an electronic system 150, such as a display device, computer, or other electronic system. Reference will be made to sensor electrode pattern 200 of FIG. 2A and to one or more of FIGS. 6A, 6B, 6C and 6D in describing example operations of processing system 100A.

In one embodiment, processing system 110A includes, among other components: sensor module 510, and determination module 520. Processing system 110A and/or components thereof may be coupled with sensor electrodes of a pattern of sensor electrodes, such as sensor electrode pattern 200 or 210, among others. For example, sensor module 510 is coupled with one or more sensor electrodes (Y, X) of a sensor electrode pattern (e.g., sensor electrode pattern 200) of input device 100.

Sensor module 510 includes sensing circuitry that is coupled to sensor electrodes of a sensor electrode pattern, such as via routing. Sensor circuitry of sensor module 510 may include logic and, in many embodiments, the sensor circuitry includes one or more amplifiers and associated circuitry used for transmitting and receiving signals. Such an amplifier may be interchangeably referred to as an "amplifier," a "front-end amplifier," a "receiver," an "integrating amplifier," a "differential amplifier," "transimpedance amplifier", or the like, and operates, in some embodiments, to receive a resulting signal (e.g., the resulting signal may be a current signal) at an input and provide a proportional charge which may be output as an integrated voltage. In one or more embodiments, the sensor module 510 maintains a low impedance input when measuring input current or charge. In some embodiments, sensor module 510 may also operate the same or a different amplifier to drive (or modulate) a transmitter signal onto a sensor electrode. The resulting signal is from one or more sensor electrodes of a sensor electrode pattern, such as sensor electrode pattern 200, and includes effects that result from a transmitter signal that has been driven onto the sensor electrode or onto another sensor electrode of the sensor electrode pattern or effects corresponding to an input object proximate the sensor electrode pattern to which sensor module 510 is coupled. In some embodiments, a single amplifier may be coupled with and used to receive a resulting signal exclusively from a single sensor electrode. In such embodiments, there would be at least one amplifier for each sensor electrode in a sensor electrode pattern from which a signal is received. For example, in some embodiments, a first amplifier may be coupled with a first sensor electrode while a second amplifier is coupled with a second sensor electrode, etc., for the number of sensor electrodes from which signals are received by sensor module 510. In other embodiments, multiple resulting signals from different sensor electrodes may be summed by sensor module 510. For example, sensor electrodes may be coupled to different ones of multiple current conveyors whose output may summed into a single amplifier. In yet other embodiments, multiple sensor electrodes may be coupled to a common amplifier through a multiplexer. The multiplexer may select one sensor electrode at a time or multiple sensor electrodes at a time. Furthermore, a multiplexer may allow for sensor electrodes to be connected to different receivers or with different polarities or phases to the same receiver.

Sensor module 510 operates to interact with the sensor electrodes of a sensor electrode pattern, such as sensor electrode pattern 200, that are utilized to generate a sensing region 120. This includes operating one or more sensor electrodes Y to be silent (e.g., not modulated relative to other sensor electrodes), to be driven with a transmitter signal, to be used for transcapacitive sensing (intra-set or set-to-set), and/or to be used for absolute capacitive sensing. This also includes operating one or more sensor electrodes X to be silent, to be driven with a transmitter signal, to be used for transcapacitive sensing (intra-set or set-to-set), and/or to be used for absolute capacitive sensing.

During transcapacitive sensing, sensor module 510 operates to drive a transmitter signals on one or more sensor electrodes of a set of sensor electrodes (e.g., one or more of sensor electrodes Y and/or one or more of sensor electrodes X). A transmitter signal may be a square wave, trapezoidal wave, sine wave, or some other modulated signal. In a given time interval, sensor module 510 may drive or not drive a transmitter signal (waveform) on one or more of the multitude of sensor electrodes of the sensor electrodes to which it is coupled. Sensor module 510 may also be utilized to couple one or more of the non-driven sensor electrodes to high impedance, ground, or a constant voltage potential, or a modulated voltage when not driving a transmitter signal on such sensor electrodes. In some embodiments, when performing transcapacitive sensing, sensor module 510 drives two or more transmitter electrodes of a sensor electrode pattern at one time. When driving two or more sensor electrodes of a sensor electrode pattern at once, the transmitter signals may be coded according to a coding scheme. The coded transmitter signals may include a varying phase, frequency and/or amplitude. In various embodiments, the coding scheme may be at least substantially orthogonal. Further, the code(s) used may be altered, such as by lengthening or shortening a code to avoid or resist interference. In some embodiments, sensor module 510 is configured to drive multiple sensor electrodes transmitter signals, where each of the multiple sensor electrodes are each driven with a different transmitter signal and where the transmitter signals are each coded according to a coding scheme. In such embodiments, the sensor electrodes may be simultaneously driven. Sensor module 510 also operates to receive resulting signals, via a second multitude of sensor electrodes during transcapacitive sensing. During transcapacitive sensing, received resulting signals correspond to and include effects corresponding to the transmitter signal(s) transmitted via sensor electrodes that are driven with transmitter signals. These transmitted transmitter signals may be altered or changed in the resulting signal at the receiver due to presence of an input object, stray capacitance, noise, interference, and/or circuit imperfections among other factors, and thus may differ slightly or greatly from their transmitted versions.

In absolute capacitive sensing, sensor module 510 both drives a sensor electrode relative to system ground or an input object and uses that driven sensor electrode to receive a resulting signal that results from at least the signal driven on to the sensor electrode. In this manner, during absolute capacitive sensing, sensor module 510 operates to drive a signal on to and receive a signal from one or more of sensor electrodes Y or X. During absolute capacitive sensing, the driven signal may be referred to as an absolute capacitive sensing signal, transmitter signal, or modulated signal, and it is driven through a routing trace that provides a communicative coupling between processing system 110A and the sensor electrode(s) with which absolute capacitive sensing is being conducted. It should be appreciated that the transmitter signal driven onto a particular sensor electrode for transcapacitive sensing and the transmitter signal driven on to that same particular electrode for absolute capacitive sensing may be similar or identical.

In combined capacitive sensing, sensor module 510 may operate to drive a modulated transmitter signal on one sensor electrode of a sensor electrode pattern while receiving resulting signals (which include effects that result from the transmitter signal) on at least one and up to all other sensor electrodes of the sensor electrode pattern, and while simultaneously also using the modulated transmitter signal to charge and then receive resulting signals from the driven sensor electrode for measuring absolute capacitance with that sensor electrode. That is, sensor module 510 may operate to both drive and receive signals in a manner that facilitates simultaneous absolute capacitive sensing and transcapacitive sensing. It should be appreciated that, when performing combined capacitive sensing, sensor module 510 may drive transmitter signals on more than one sensor electrode either concurrently or at different times. Further, processing system 110 may be configured to receive resulting signals corresponding to an absolute capacitive coupling on more than one sensor electrode either concurrently or at different times. As described earlier, the transmitter signal may be substantially orthogonal, such that they are orthogonal in time, code, frequency, etc.

Determination module 520 may be implemented as hardware (e.g., hardware logic and/or other circuitry) and/or as a combination of hardware and instructions stored in a non-transitory manner in a computer readable storage medium.

In embodiments where transcapacitive sensing is performed, determination module 520 operates to compute/determine a measurement of a change in a transcapacitive capacitive coupling between a first and second sensor electrode during transcapacitive sensing. Determination module 520 then uses such measurements to determine the positional information including the position of an input object (if any) with respect to sensing region 120. With reference to FIG. 2A, by way of example, the positional information can be determined from a capacitive image formed of capacitive couplings/pixels like 290, a capacitive profile (transcapacitive or absolute capacitive) formed from capacitive couplings/pixels like 295, 297, and/or 299, or some combination thereof. With reference to FIG. 2B, the position information can be determined from a capacitive image or profile formed of capacitive couplings/pixels like 280, 281, 282, 283, and/or 284, or some combination thereof. In some embodiments, multiple capacitive images/profiles may be combined, correlated, and/or compared to determine position information. The capacitive image(s)/profile(s) is/are determined by determination module 520 based upon resulting signals acquired by sensor module 510. It is appreciated that, when applicable, determination module 520 operates to decode and reassemble coded resulting signals to construct capacitive image(s)/profiles(s) from one or more transcapacitive scan of a multitude of sensor electrodes.

In embodiments where absolute capacitive sensing is performed with sensor electrodes Y and/or X, determination module 520 also operates to compute/determine a measurement of absolute capacitive coupling (also referred to as background capacitance, $C_B$) to a sensor electrode which may be used to form a baseline. When an input object is within a sensing region, this additionally includes a measuring of absolute capacitance between the driven sensor electrode(s) and the input object which may change the total absolute capacitance relative to the baseline. With respect to the techniques described herein, determination module 520 operates to determine an absolute capacitance of the sensor electrode (e.g., sensor electrode X1) after an absolute capacitive sensing signal has been driven on the sensor electrode. Determination module 520 operates to construct capacitive profiles from a multitude of absolute capacitance measurements on an axis. For example, in an embodiment where absolute capacitances are measured on individual sensor electrodes X of sensor electrode pattern 200, determination module 520 determines and constructs a first capacitive profile from these absolute capacitive measurements. Similarly, in an embodiment where absolute capacitances are measured on individual sensor electrodes Y of sensor electrode pattern 200, determination module 520 determines and constructs a second capacitive profile from these absolute capacitive measurements. In various embodiments, peaks in the measured response or significant changes in curvature of the measurements relative to a baseline may be used to identify the location of input objects.

In embodiments where combined capacitive sensing is performed with a sensor electrode pattern and produces resulting signals associated with both absolute capacitive measurements and transcapacitive measurements, determination module 520 operates to determine capacitive images, transcapacitive profiles, and/or absolute capacitive profiles from the received resulting signals and can also combine, correlate, and/or compare images, profiles, and/or individual capacitances determined from resulting signals in order to determine position information of any input objects in a sensing region of the sensor electrode pattern. In some embodiments, determination module 520 combines, correlates, and/or compares these various measurements, profiles, and images, to determine positional information with respect to an input object and/or to determine instances when low ground mass effect ($C_{XF}$ or $C_{YF}$ is substantially equal to $C_{FG}$) may make it seem as if an input object is present (e.g., in a capacitive image) but is not (because it does not also exist a profile). Alternately, in various embodiments, where an object appears significant in an intra-axis transcapacitive profile, but does not appear in the absolute profile, then the object may also be ignored and not reported or absorbed into an image baseline (e.g., it may be a coin or water droplet).

In some embodiments, processing system 110A includes decision making logic which directs one or more portions of processing system 110A, such as sensor module 510 and/or determination module 520, to operate in a selected one of a multitude of different operating modes based on various inputs.

Processing System Operation

Several examples will now be discussed to illustrate, in part, the operations of processing system 110A. Reference will be made to sensor electrode pattern 200 of FIG. 2A in the description of these examples. In these, examples and elsewhere herein, it should be appreciated that two sets of substantially orthogonal sensor electrodes (e.g., sensor electrodes X and sensor electrodes Y of sensor electrode pattern 200) are often described. It should be appreciated that the substantially orthogonal sets of sensor electrodes may be disposed in entirely different layers from one another in the sensor electrode pattern, partially in the same layer as one another in the sensor electrode pattern, or entirely in the same common layer as one another in the sensor electrode pattern (e.g., a single layer sensor electrode pattern). Further with reference to FIG. 2B, the sensor electrodes may be disposed in a matrix (regular or irregular) pattern. In such an embodiment, the sensor electrodes may include a similar shape and/or size. Further, the sensor electrode may cover substantially the entire sensing area (e.g., with very small non-overlapping gaps). Routing traces coupled to the sensor electrodes may be disposed on a common layer to sensor electrodes or on a different layer. The sensor electrodes or grid electrodes between the sensor electrodes may substantially shield the routing traces from the effect of user inputs. Further, the routing traces may be included of a common material to the sensor electrodes or a different material.

Further still, while not illustrated, one or more grid electrodes may be disposed between the sensor electrodes.

Consider an example where sensor electrode X1 of sensor electrode pattern 200 is driven by sensor module 510 with a modulated transmitter signal. In such an embodiment, first resulting signals (used for absolute capacitive measurement) may be received from sensor electrode X1 while second, third, fourth, etc. resulting signals (including effects of the modulated transmitter signal and used for transcapacitive measurement) are simultaneously received from one or more other sensor electrodes (e.g., X2, X3, X4, Y1, Y2, Y3, Y4, and Y5) of the sensor electrode pattern 200. For example, resulting signals may be received simultaneously on up to all of sensor electrodes X2, X3, X4, Y1, Y2, Y3, Y4, and Y5. In some embodiments, processing system 110A (e.g., sensor module 510) may drive a guarding signal on a sensor electrode that is in proximity to the sensor electrode being driven with the transmitter signal; the guarding signal may be in-phase with the transmitter signal. For example, if a modulated transmitter signal is driven on sensor electrode X1, a guarding signal may be driven on sensor electrode X2 at the same or at different amplitude that the modulated transmitter signal. In such a case, resulting signals may not be received from the sensor electrode that is used for guarding. In one specific embodiment, the guarding signal is in phase with and includes the same amplitude as the transmitter signal. Further, in some embodiments, the sensor electrode driven with the guard signal may be used to measure a capacitance to system ground.

Determination module 520 then determines a capacitive coupling (e.g., an absolute capacitance) between an input object and the first sensor electrode, e.g., X1, based on the first resulting signals and a change in capacitive coupling between the first and second sensor electrodes based on the second resulting signals. In an embodiment where the second sensor electrode is X2, a change in capacitive coupling between sensor electrode X1 and sensor electrode X2 is determined; if the second sensor electrode is Y5 the change in capacitive coupling between sensor electrode X1 and sensor electrode Y5 is determined.

In some embodiments, sensor module 510 drives a modulated signal on one sensor electrode of a sensor electrode pattern and concurrently drives a second modulated transmitter signal on a second sensor electrode of the sensor electrode pattern. In one such embodiment, the second modulated signal may have a phase opposite that of the modulated signal. For example, in one embodiment, when sensor module 510 drives a modulated transmitter signal on sensor electrode X1 of sensor electrode pattern 200, sensor module 510 also drives a second transmitter signal (e.g., having opposite phase of the transmitter signal) onto sensor electrode Y5. When sensor module 510 receives resulting signals from sensor electrodes other than those being driven (e.g., sensor electrodes X2, X3, X4, Y2, Y3, Y4, and Y5) the resulting signals include effects from both the modulated transmitter signal and the second modulated transmitter signal. Alternatively, sensor electrodes $X_1$ and $Y_1$ may be driven with signals being based on different codes or frequencies. In various embodiments, while sensor electrode $Y_5$ is modulated relative to system ground the one or more other sensor electrodes may not be modulated relative to system ground. In such embodiments, sensor electrode $Y_5$ may be configured to receive a resulting signal that may be used to determine a measure of the change in absolute capacitance of sensor electrode $Y_5$ and changes in transcapacitances between sensor electrode $Y_5$ and other sensor electrodes. By also driving sensor electrode $X_1$ with a transmitter signal having an opposite phase, the change in transcapacitance between $Y_5$ and $X_1$ may be larger than the change between $Y_5$ and other sensor electrodes. In some embodiments, this change may be almost twice as large.

In some embodiments, when a "one hot" technique is employed, after a modulated signal is driven on a first electrode sensor module 510 drives a second modulated signal on a second and different sensor electrode. For example, if the modulated signal was driven on sensor electrode X1 of sensor electrode pattern 200, first resulting signals could be received from sensor electrode X1, while second resulting signals are received from sensor electrode X2 and third resulting signals are received from sensor electrode Y5. At a time after the first modulated signal has been driven (e.g., not concurrent with) a second modulated signal is driven. The second modulated signal is not driven on sensor electrode X1, but instead on another of the sensor electrodes (e.g., X2, X3, X4, Y1, Y2, Y3, Y4, or Y5). Resulting signals, used for absolute capacitive sensing can then be received on the driven sensor electrode while simultaneously receiving resulting signals (including effects of the second modulated signals and used for transcapacitive sensing) from any one or more of the non-driven sensor electrodes. For example, the second modulated signal can be driven on sensor electrode X2 and fourth resulting signals for absolute capacitive sensing can be received from sensor electrode X2 while simultaneously receiving fifth and sixth resulting signals for transcapacitive sensing from sensor electrodes X1 and Y5. Alternatively, in another example, the second modulated signal can be driven on sensor electrode Y5 and fourth resulting signals for absolute capacitive sensing can be received from sensor electrode Y5 while simultaneously receiving fifth and sixth resulting signals for transcapacitive sensing from sensor electrodes X1 and X2. Then, based at least on the first, second, third, fourth, fifth and sixth resulting signals, determination module 520 determines a first set-to-set capacitive image along a first axis (e.g., an axis associated with the X sensor electrodes), a second set-to-set capacitive image along a second axis (e.g., an axis associated with the Y sensor electrodes), an absolute capacitive profile along the first axis, an absolute capacitive profile along the second axis, a transcapacitive profile along the first axis (e.g., an intra-set transcapacitive profile of the X electrodes), and a transcapacitive profile along the second axis (e.g., an intra-set transcapacitive profile of the Y electrodes).

Referring now to FIGS. 6A-6D, it should be appreciated that FIGS. 6A, 6B, 6C, and 6D only illustrate sensor electrodes of sensor electrode pattern 200 and eliminate depiction of insulating layers, substrates, routing traces, and the like to more clearly depict capacitances measured in various embodiments. Additionally, in FIGS. 6A-6D, for convenience of labeling capacitances, input object 140 is also represented by a legend of F1 for "Finger 1." It should be appreciated that the description and techniques presented with respect to FIGS. 6A-6D may similarly be applied to the sensor electrode pattern 210 of FIG. 2B.

Figure 6A:
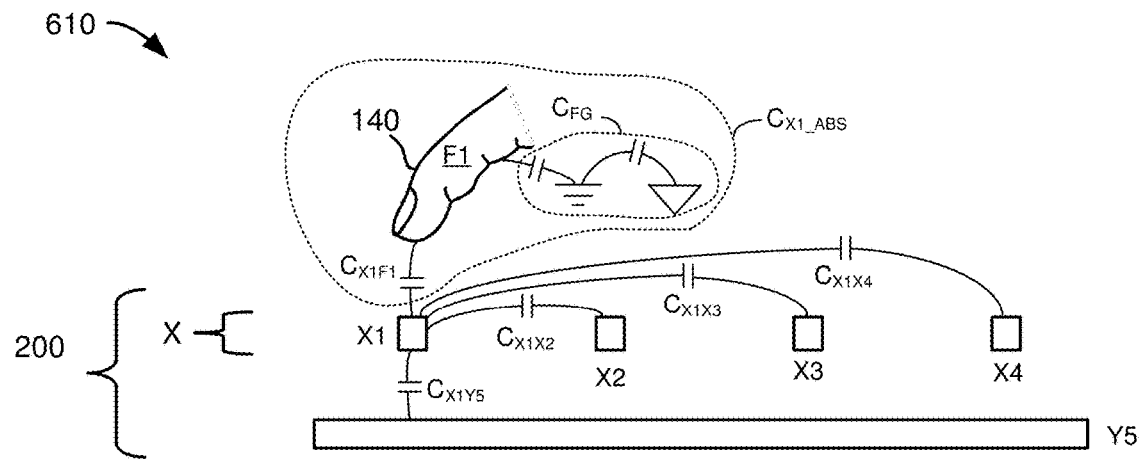
FIG. 6A shows an exploded front side elevation of the example sensor electrode pattern of FIG. 2A with labeled capacitances, according to an embodiment.

FIG. 6A shows an exploded front side elevation 610 of the example sensor electrode pattern 200 of FIG. 2A with labeled capacitances, according to an embodiment. In FIG. 6A, in one embodiment, sensor module 510 drives only sensor electrode X1 with a modulated transmitter signal. This is an example of the "one hot" technique that has been previously mentioned. Sensor module 510 receives resulting signals from sensor electrodes X1, X2, X3, X4, and Y5 which respectively allow determination module 520 to determine capacitances $C_{X1\_ABS}$ (a combination of $C_{X1F1}$ and $C_{FG}$), $C_{X1X2}$, $C_{X1X3}$, $C_{X1X4}$ and $C_{X1Y5}$. This allows the sensor module to determine the measurements substantially independently. Further, $C_{X1F1}$ may be relatively stationary during measurements. $C_{X1F1}$ allows for the coupling $C_{X1}$ to ground of finger freespace to be determined. Further, while not illustrated, a capacitance coupling exists between sensor electrode X1 and system ground (electrode G in FIG. 3A) and possibly other electrodes not shown, and depending on their relative voltage modulation (e.g. grounded or transmitting an opposite polarity but not guarding X1), they may be included in a measurement of charge through X1 and affect measurement of $C_{X1\_ABS}$.

Figure 6B:
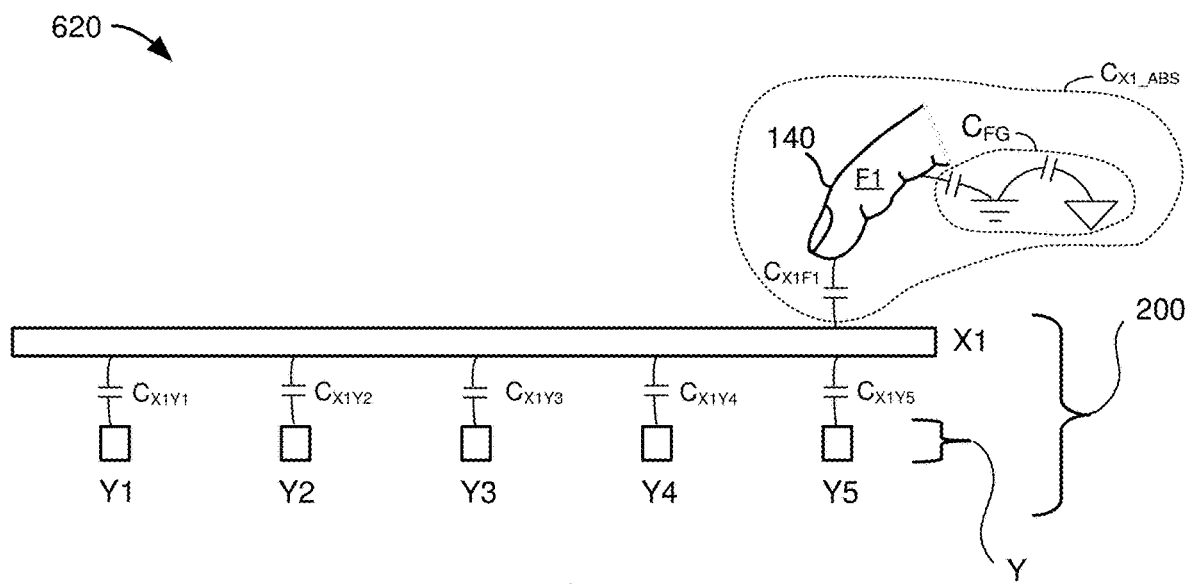
FIG. 6B shows an exploded left side elevation of the example sensor electrode pattern of FIG. 2A with labeled capacitances, according to an embodiment.

FIG. 6B shows an exploded left side elevation 620 of the example sensor electrode pattern 200 of FIG. 2A with labeled capacitances, according to an embodiment. FIG. 6B continues the example illustrated in FIG. 6A and shows that when sensor electrode X1 is driven with a modulated transmitter signal sensor module 510 also receives resulting signals from sensor electrodes Y1, Y2, Y3, and Y4, which respectively allow determination module 520 to determine capacitances $C_{X1Y1}$, $C_{X1Y2}$, $C_{X1Y3}$, and $C_{X1Y4}$. Following this one hot technique, other X electrodes can be driven in-turn, and resulting signals can be received in a similar fashion.

Figure 6C:
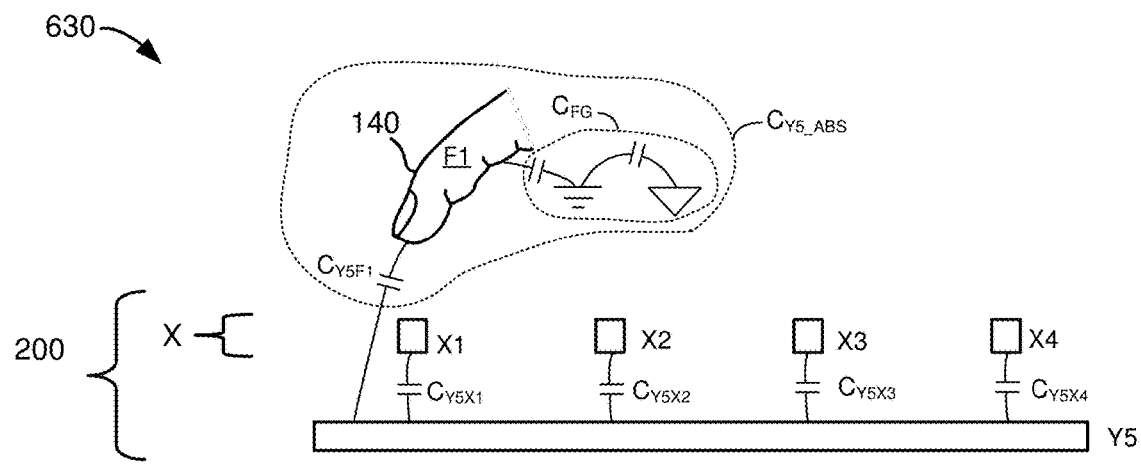
FIG. 6C shows an exploded front side elevation of the example sensor electrode pattern of FIG. 2A with labeled capacitances, according to an embodiment.

FIG. 6C shows an exploded front side elevation 630 of the example sensor electrode pattern 200 of FIG. 2A with labeled capacitances, according to an embodiment. In FIG. 6C, in one embodiment, sensor module 510 drives only sensor electrode Y5 with a modulated transmitter signal. This is an example of the "one hot" technique that has been previously mentioned. Sensor module 510 receives resulting signals from sensor electrodes X1, X2, X3, X4, and Y5 which respectively allow determination module 520 to determine capacitances $C_{Y5X1}$, $C_{Y5X2}$, $C_{Y5X3}$, $C_{Y5X4}$ and $C_{Y5\_ABS}$ (a combination of $C_{Y5F1}$ and $C_{FG}$).

Figure 6D:
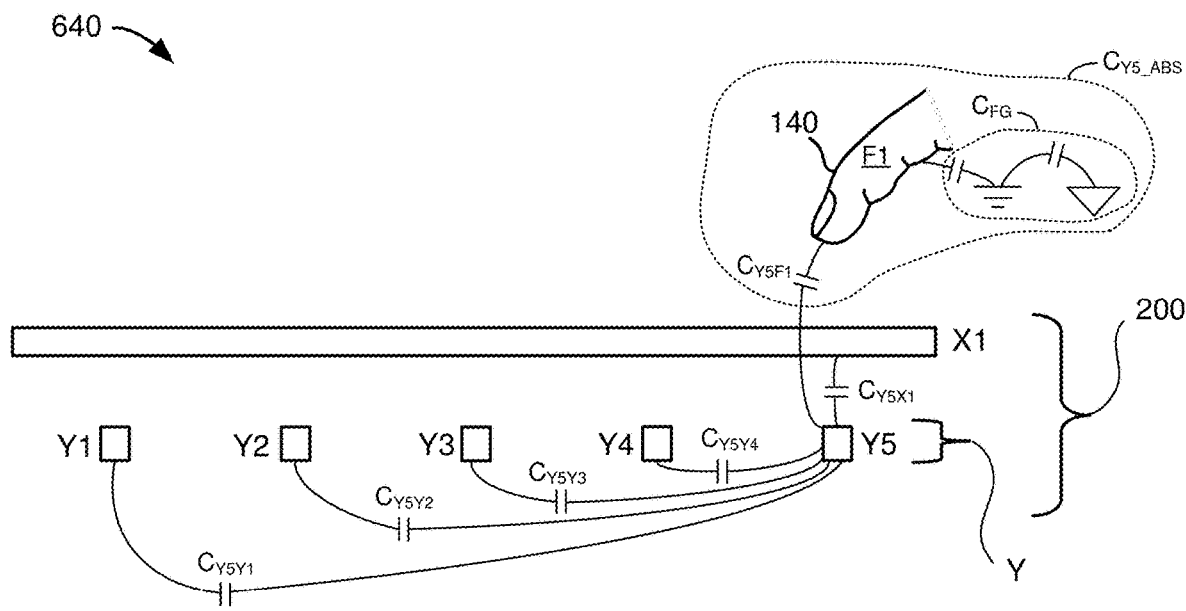
FIG. 6D shows an exploded left side elevation of the example sensor electrode pattern of FIG. 2A with labeled capacitances, according to an embodiment.

FIG. 6D shows an exploded left side elevation 640 of the example sensor electrode pattern 200 of FIG. 2A with labeled capacitances, according to an embodiment. FIG. 6D continues the example illustrated in FIG. 6C and shows that when sensor electrode Y5 is driven with a modulated transmitter signal sensor module 510 also receives resulting signals from sensor electrodes Y1, Y2, Y3, and Y4, which respectively allow determination module 520 to determine capacitances $C_{Y5Y1}$, $C_{Y5Y2}$, $C_{Y5Y3}$, and $C_{Y5Y4}$. Following this one hot technique, other Y electrodes can be driven in-turn, and resulting signals can be received in a similar fashion.

Example Methods of Operation

FIGS. 7A-7G illustrate a flow diagram 700 of various embodiments of a method of capacitive sensing. Procedures of embodiments of this method will be described with reference to elements and/or components of one or more of FIGS. 1-6D. It is appreciated that in some embodiments, the procedures may be performed in a different order than described, that some of the described procedures may not be performed, and/or that one or more additional procedures to those described may be performed. Likewise, it is appreciated that some procedures are carried out by components of processing system such as processing system 100A and/or stored instructions implemented by a processing system such as processing system 100A.

With reference to FIG. 7A, at procedure 701 of flow diagram 700, in one embodiment, a modulated signal is driven onto a first sensor electrode of a sensor electrode pattern. With respect to sensor electrode pattern 200, this can include driving a modulated transmitter signal onto any one of the sensor electrodes X or the sensor electrodes Y. For purposes of example, in one embodiment, this includes processing system 110A (e.g., sensor module 510) driving a modulated transmitter signal onto sensor electrode X1 of sensor electrode pattern 200.

With continued reference to FIG. 7A, at procedure 702 of flow diagram 700, in one embodiment, first resulting signals are received from the first sensor electrode. Following the example started in procedure 701, if sensor electrode X1 is the first sensor electrode, then resulting signals are received from sensor electrode X1 by processing system 110A (e.g., by sensor module 510). The resulting signals may be used to determine a first charge measurement, $Qx_{1F1}$ (or more generally the series capacitance through $C_{X1ABS}$).

With continued reference to FIG. 7A, at procedure 703 of flow diagram 700, in one embodiment, second resulting signals are received from a second sensor electrode of the sensor electrode pattern. The second resulting signals include effects corresponding to the modulated signal; and the first resulting signals and the second resulting signals are simultaneously received. The second resulting signals may be used to determine a second charge measurement, $Q_{X1X2}$. Following the example of 701 and 702, in an embodiment where sensor electrode X1 is driven with a modulated transmitter signal, second resulting signals can be received by processing system 110A (e.g., by sensor module 510) from any of the remaining driven sensor electrodes of sensor electrode pattern 200. For example, in one embodiment, processing system 110A (e.g., sensor module 510) receives second resulting signals from sensor electrode X2. In another embodiment, for example, processing system 110A (e.g., sensor module 510) receives the second resulting signals from sensor electrode Y5. The second resulting signals may be used to determine a third charge measurement, $Q_{X1Y5}$.

With continued reference to FIG. 7A, at procedure 704 of flow diagram 700, in one embodiment, a capacitive coupling is determined between an input object and the first sensor electrode based on the first resulting signals and change in capacitive coupling between the first and second sensor electrodes based on the second resulting signals. With reference to the example described in procedure 703, processing system 110A (e.g., determination module 520) makes the determination of capacitive coupling in the manner previously described herein. For example, this can include utilizing, combining, correlating, and/or comparing one or more absolute capacitive profiles, one or more transcapacitive profiles, and one or more capacitive images which are determined from the resulting signals. For example, capacitance $C_{X1F1}$ may be determined based on $Qx_{1F1}$ and a first delta voltage and a capacitance $C_{X1X2}$ may be determined based on $Q_{X1X2}$ and a second delta voltage. The first delta voltage may be defined as a first voltage and system ground and the second delta voltage may be defined as the first voltage and a second voltage, where the second voltage may be ground.

Figure 7B:
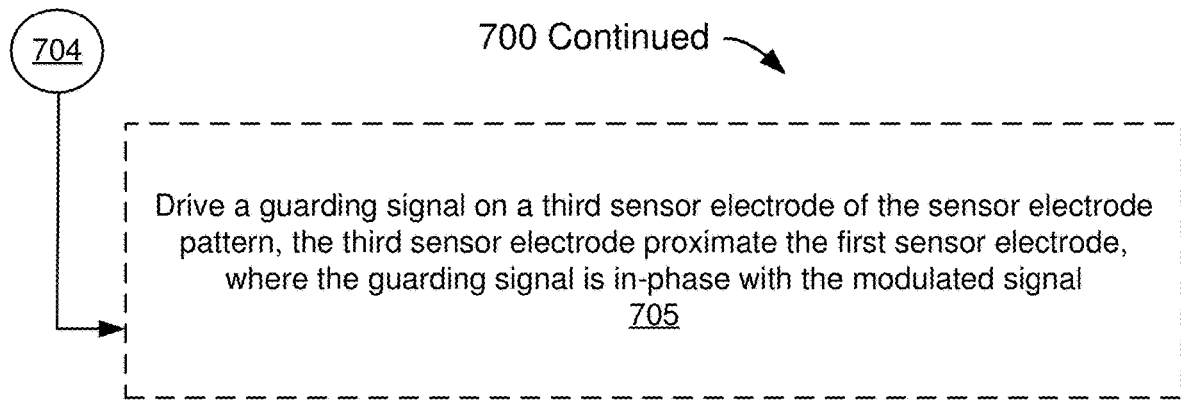

With reference to FIG. 7B, as illustrated in procedure 705 of flow diagram 700, in some embodiments, the method as described in 701-704 further includes driving a guarding signal is on a third sensor electrode of the sensor electrode pattern. The third sensor electrode is proximate the first sensor electrode and the guarding signal is in-phase with the modulated signal. In one embodiment, following the example discussed in procedures 701 where a modulated transmitter signal is driven on sensor electrode X1, a guard signal is driven by processing system 110A (e.g., sensor module 510) on sensor electrode X2. Sensor electrode X2 is proximate and immediately adjacent (no sensor electrodes between the two) to sensor electrode X1. Additionally, sensor electrodes X1 and X2 are in the set of sensor electrodes X that are oriented along a common axis with one another. In one embodiment, the guarding signal is the same modulated transmitter signal that is driven on sensor electrode X1. The guarding signal may be of lesser amplitude (i.e. underguarding), the same amplitude, or greater amplitude (i.e. overguarding) than the modulated transmitter signal driven on sensor electrode X1. In another example, if the modulated transmitter signal were being driven on sensor electrode Y3, a guarding signal could be driven on one or more of sensor electrodes Y2 and Y4.

Figure 7C:
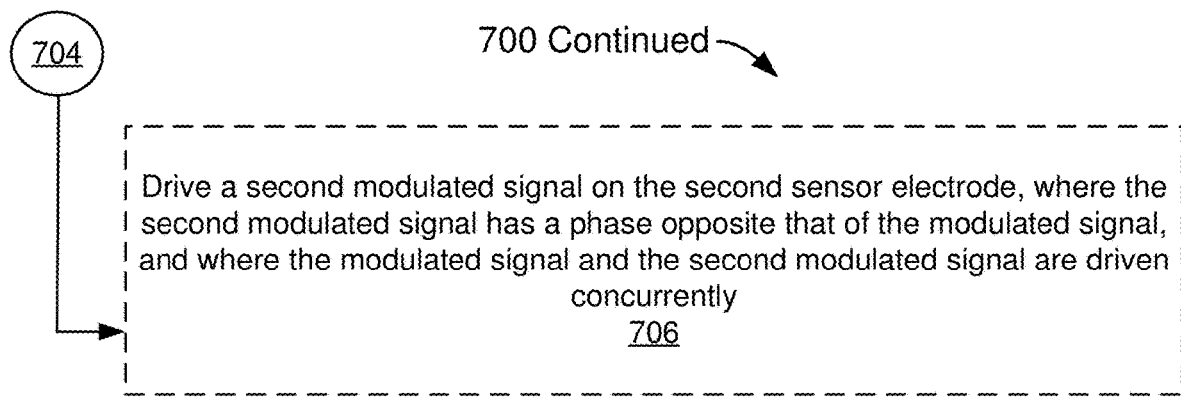

With reference to FIG. 7C, as illustrated in procedure 706 of flow diagram 700, in some embodiments, the method as described in 701-704 further includes driving a second modulated signal on the second sensor electrode, wherein the second modulated signal has a phase opposite that of the modulated signal, and wherein the modulated signal and the second modulated signal are driven concurrently. In one embodiment, this includes driving the second modulated signal on a sensor electrode that is oriented along a different axis that the axis of orientation of the first sensor electrode. With reference to the example of procedures 701-704 where the first sensor electrode is sensor electrode X1, a second modulated transmitter signal that is 180 degrees out of phase (but otherwise the same) can be driven on sensor electrode Y5 (or any other sensor electrode Y). The phase difference means that the signal to noise ratio is increased (e.g., one sensor electrode is being driven with a high signal while the other is being driven with a low signal, and there is a difference in potential between the two that increases SNR). In such an embodiment, the previously discussed receipt of second resulting signals from the second sensor electrode of the sensor electrode pattern, now includes: receiving the second resulting signals from the second sensor electrode of the sensor electrode pattern (e.g., by sensor module 510), where the second resulting signals include effects corresponding to the modulated signal driven on the first sensor electrode and the second modulated signal driven on the second sensor electrode.

Figure 7F:
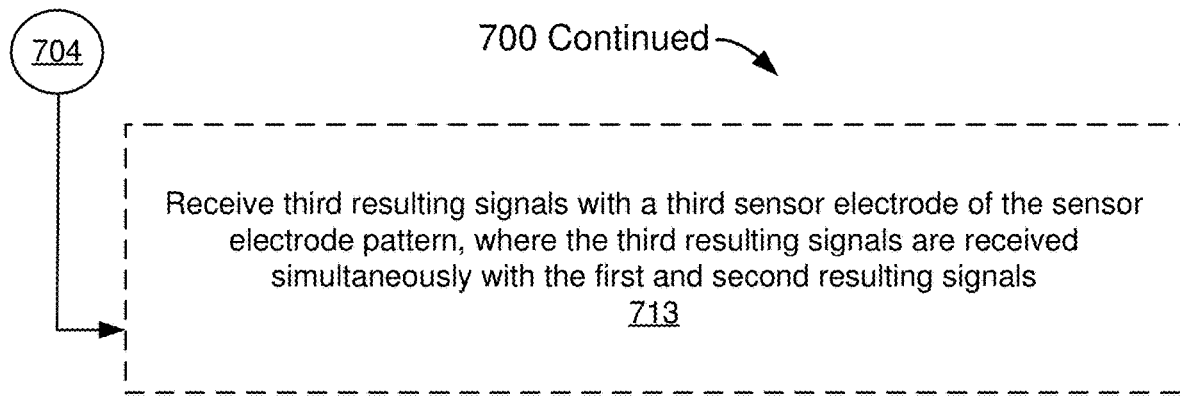
Figure 7D:
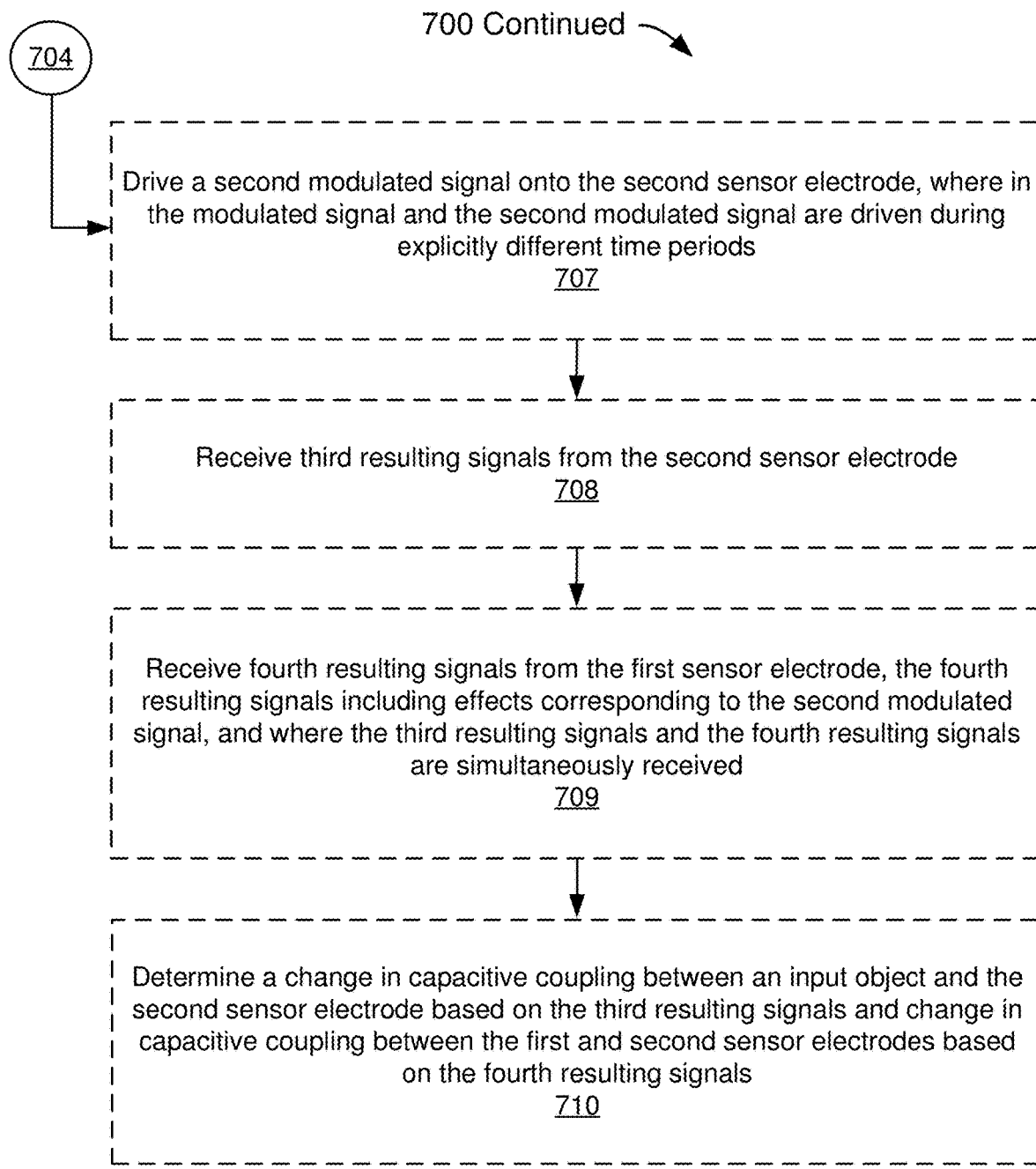

With reference to FIG. 7D, as illustrated in procedure 707 of flow diagram 700, in some embodiments, the method as described in 701-704 further includes driving a second modulated signal onto the second sensor electrode of the sensor electrode pattern, where the modulated signal and the second modulated signal are driven during explicitly different time periods. For example, during the first time period the modulated signal may be driven on sensor electrode X1 as described in procedures 701-704; and during a second, different time period that does not overlap with the first time period, the modulated signal is driven by processing system 110A onto the second sensor electrode (e.g., onto sensor electrode X2 or sensor electrode Y5 in the previous example). In other embodiments, two or more modulated signals based on distant (and possible substantially orthogonal) codes can be driven onto different corresponding sensor electrodes. In such embodiments, each electrode may be decoded separately. In various embodiments, a first coding scheme may be used for absolute sensing a second and different coding scheme may be used for transcapacitive sensing. For example, Hadadmard codes may be used for absolute sensing while codes based on Linear Shift Registers may be used for transcapacitive sensing. Another method of simultaneously measuring independent capacitive couplings is to use substantially orthogonal frequencies such that an electrode (e.g., Y5) may be substantially guarding at one frequency (e.g. for a first absolute capacitive measurement by another electrode such as X1), while substantially stationary at another (e.g. for a second transcapacitive measurement by another electrode such as Y4), and even substantially opposite phase at a third frequency (e.g., for a third transcapacitive measurement by another electrode such as X2). Yet another method is to make independent capacitive measurements at different phases (e.g., 90 degrees for orthogonal sine and cosine modulations) such that measurements of absolute and transcapacitance can be made simultaneously.

With continued reference to FIG. 7D, at procedure 708 of flow diagram 700, the method as described in procedures 701-704 and 707 further includes, receiving third resulting signals from the second sensor electrode. The third resulting signals are received from the second sensor electrode after being driven with the second modulated signal. Following the ongoing example, in an embodiment where sensor electrode X2 is the second sensor electrode, sensor module 510 receives the third resulting signals from it; and in an embodiment where sensor electrode Y5 is the second sensor electrode, sensor module 510 receives the second resulting signals from it.

With continued reference to FIG. 7D, at procedure 709 of flow diagram 700, the method as described in procedures 701-704, 707, and 708 further includes, receiving fourth resulting signals from the first sensor electrode. The fourth resulting signals include effects corresponding to the second modulated signal, and the third resulting signals and the fourth resulting signals are simultaneously received. Following the ongoing example from procedures 701-704, the fourth resulting signals are received by sensor module 510 from sensor electrode X1.

With continued reference to FIG. 7D, at procedure 710 of flow diagram 700, the method as described in procedures 701-704, 707, 708, and 709 further includes, determining a change in capacitive coupling between an input object and the second sensor electrode based on the third resulting signals and change in capacitive coupling between the first and second sensor electrodes based on the fourth resulting signals. In one embodiment, processing system 110A (e.g., determination module 520) makes the determination of capacitive coupling in the manner previously described herein. For example, this can include utilizing combining, correlating, and/or comparing more than one type of combined measurements of one or more absolute capacitive profiles, one or more transcapacitive profiles, and one or more capacitive images which are determined from the resulting signals. In embodiments where more than two voltages are modulated, charges are accumulated on the receivers which are a combination of polarized charge on modulated capacitors. However, by balancing multiple measurements, independent capacitive estimates may be made from a single combination signal.

Figure 7E:
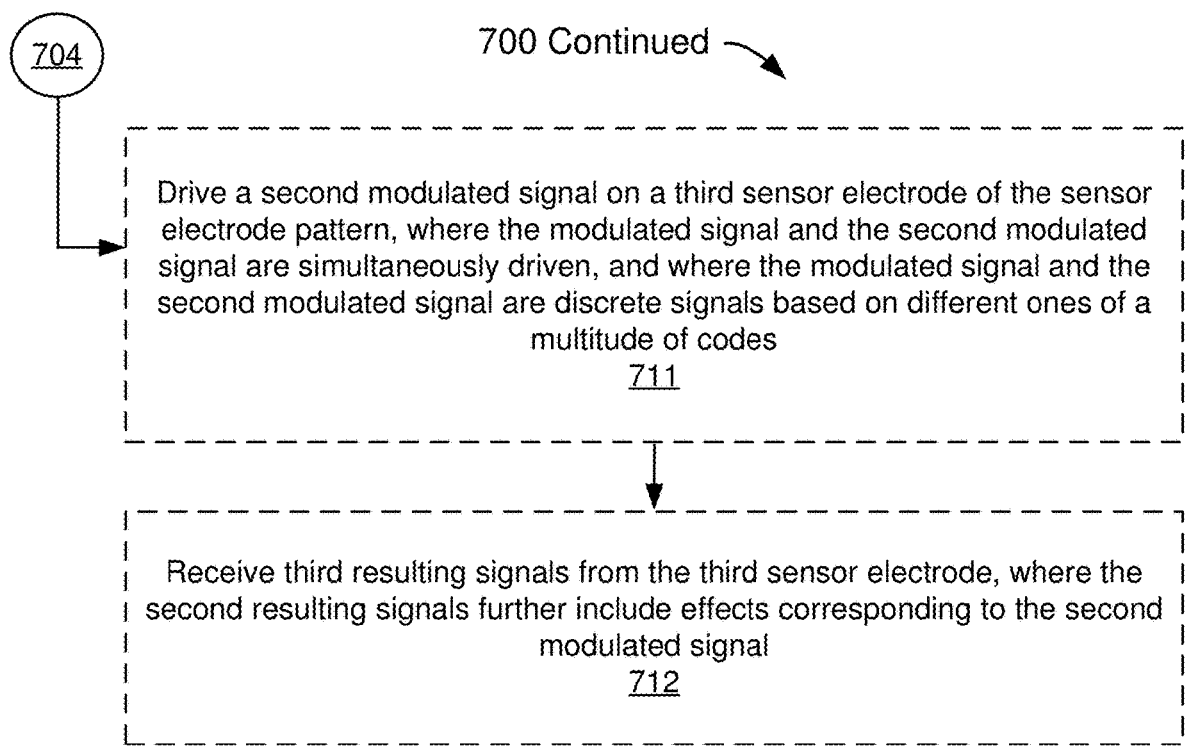

With reference to FIG. 7E, as illustrated in procedure 711 of flow diagram 700, in some embodiments, the method as described in 701-704 further includes driving a second modulated signal on a third sensor electrode of the sensor electrode pattern. The modulated signal and the second modulated signal are simultaneously driven, and the modulated signal and the second modulated signal are discrete signals based on different ones of a multitude of codes. As with the first modulated signal, the second modulated signal is driven by processing system 110A (e.g., by sensor module 510). Consider example described in procedures 701-704, where sensor electrode X1 is the first sensor electrode. In one embodiment while the modulated signal is being driving on sensor electrode X1, a second modulated signal is driven on a different sensor electrode, such as sensor electrode X3 or sensor electrode Y2. A variety of coding schemes for simultaneously driving sensor electrodes are well known to those skilled in the arts of transcapacitive sensing, and many such coding schemes may be similarly applied to drive the modulated signal and the second modulated signal as signals coded differently from one another.

With continued reference to FIG. 7E, at procedure 712 of flow diagram 700, the method as described in procedures 701-704 and 711 further includes, receiving third resulting signals from the third sensor electrode that has been driven with the second modulated signal. Processing system 110A (e.g., sensor module 510) can receive the third resulting signals. Due to two differently coded modulated signals being driven simultaneously, the previously described second resulting signals will further include effects corresponding to the second modulated signal as well as effects corresponding to the modulated signal.

With reference to FIG. 7F, as illustrated in procedure 713 of flow diagram 700, in some embodiments, the method as described in 701-704 further includes receiving third resulting signals with a third sensor electrode of the sensor electrode pattern, where the third resulting signals are received simultaneously with the first and second resulting signals. Consider the example described in procedures 701 and 704, in one embodiment, third resulting signals are received from sensor electrode X3, fourth resulting signals from sensor electrode X4, fifth resulting signals from sensor electrode Y4, sixth resulting signals from sensor electrode Y3, seventh resulting signals from sensor electrode Y2, and eighth resulting signals from sensor electrode Y1. Each of the third through eighth resulting signals includes effects from the modulated signal driven on sensor electrode X1. All of these resulting signals can be utilized by processing system 110A (e.g., by determination module 520) to determine the position of an input object with respect to sensor electrode pattern 200.

With reference to FIG. 7G, as illustrated in procedure 714 of flow diagram 700, in some embodiments, the method as described in 701-704 utilized a sensor electrode pattern that includes a first multitude of sensor electrodes disposed along a first axis (e.g., the axis of the long edge of each sensor electrodes X) and a second multitude of sensor electrode disposed along a second axis (e.g., the axis of the long edge of each of the sensor electrodes Y), where the first axis is substantially orthogonal to the second axis and where the first multitude of sensor electrodes includes the first and second sensor electrodes. In one such embodiment, the method as described in procedures 701-704 further includes receiving third resulting signals with a third sensor electrode of the second multitude of sensor electrodes, the third resulting signals includes effects corresponding to the modulated signal and wherein the third resulting signals include effects corresponding to the modulated signal driven onto the first sensor electrode. Consider an embodiment where the first sensor electrode is sensor electrode X1 and the second sensor electrode is X2, then in procedure 714, processing system 110A (e.g., sensor module 510) receives third resulting signals from a sensor electrode of the Y sensor electrodes, such as sensor electrode Y5.

With continued reference to FIG. 7G, at procedure 715 of flow diagram 700, the method as described in procedures 701-704 and 714 further includes, driving a second modulated signal onto the third sensor electrode. Following the above example, where sensor electrode Y5 is the third sensor electrode, in one embodiment, processing system 110A (e.g., sensor module 510) drives a second modulated transmitter signal on sensor electrode Y5. In one embodiment, this second transmitter signal may be modulated in the same or similar manner as the transmitter signal. In one embodiment, the second modulated transmitter signal driven at a different time that does not overlap with the driving of the transmitter signal.

With continued reference to FIG. 7G, at procedure 716 of flow diagram 700, the method as described in procedures 701-704, 714, and 715 further includes, receiving fourth resulting signals with the third sensor electrode. Following the example where sensor electrode Y5 is the third sensor electrode, in one embodiment, processing system 110A (e.g., sensor module 510) receives fourth resulting signals from sensor electrode Y5.

With continued reference to FIG. 7G, at procedure 717 of flow diagram 700, the method as described in procedures 701-704, 714, 715, and 716 further includes, receiving fifth resulting signals with the first sensor electrode, the fifth resulting signals including effects corresponding to the second modulated signal. Following the example where sensor electrode Y5 is the third sensor electrode and sensor electrode X1 is the first sensor electrode, in one embodiment, processing system 110A (e.g., sensor module 510) receives the fifth resulting signals from sensor electrode X1.

With continued reference to FIG. 7G, at procedure 718 of flow diagram 700, the method as described in procedures 701-704, 714, 715, 716, and 717 further includes, receiving sixth resulting signals with the second sensor electrode, the sixth resulting signals including effects corresponding to the second modulated signal. Following the example where sensor electrode Y5 is the third sensor electrode, sensor electrode X1 is the first sensor electrode, and sensor electrode X2 is the second sensor electrode, in one embodiment, processing system 110A (e.g., sensor module 510) receives the sixth resulting signals from sensor electrode X2.

With continued reference to FIG. 7G, at procedure 719 of flow diagram 700, the method as described in procedures 701-704, 714, 715, 716, 717, and 718 further includes, determining a first capacitive image along the first axis, a second capacitive image along the second axis, an absolute capacitive profile along the first axis, an absolute capacitive profile along the second axis, a transcapacitive profile along the first axis, and a transcapacitive profile along the second axis based on the first, second, third, fourth, fifth and sixth resulting signals. It is appreciated that many more modulated signals may be driven using the "one hot" technique (for example) described herein or using other techniques. Other resulting signals may be received and included in the first and second capacitive images, the first and second transcapacitive profiles, and the first and second absolute capacitive profiles.

Combined Capacitive Sensing

Various embodiments of the present invention provide input devices and methods that facilitate improved usability. In particular, one or more embodiments are directed to a method performed by an input device that adjusts sensor settings in the presence of low ground mass (LGM) conditions. In particular, sensor settings for combined capacitive sensing are adjusted in one or more embodiments.

Figure 8:
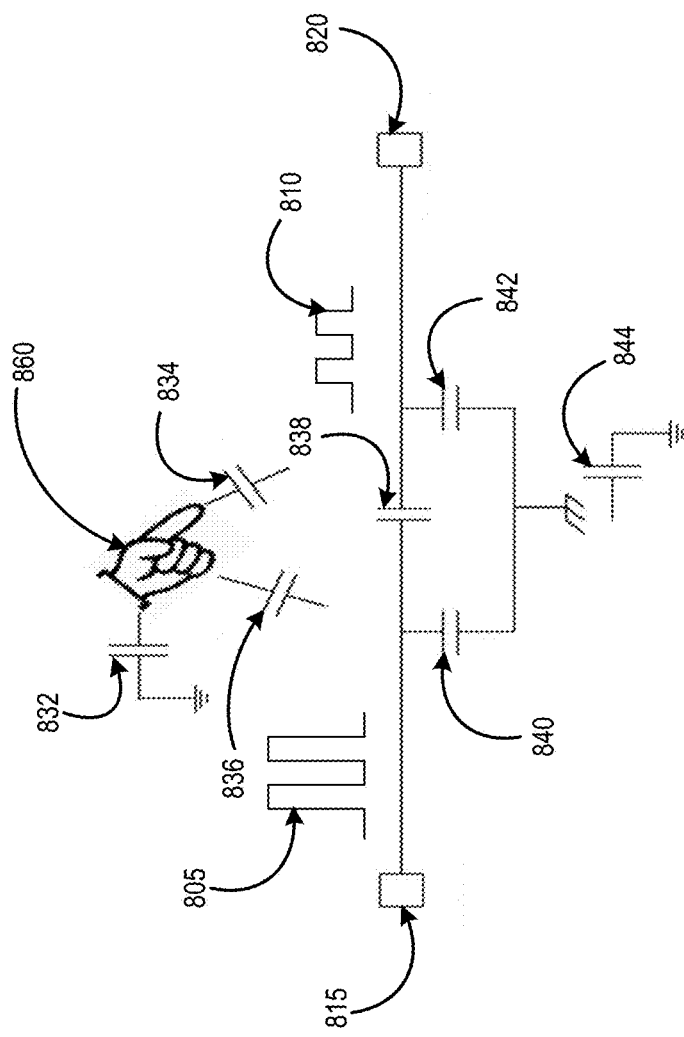
FIG. 8 shows a capacitive diagram in accordance with one or more embodiments.

Turning to FIG. 8, FIG. 8 illustrates a capacitive sensing scheme in accordance with one or more embodiments. In particular, a sensing signal (805) (also called $k_{TX}V_{DD}$), or another sensing signal with a modulated amplitude relative to a receiver electrode is driven along various transmitter electrodes (TX) (815), which produces various resulting signals. Simultaneously, another sensing signal (810) (also called αVDD) is driven along various receiver electrodes (RX) (820). The composite resulting signals are obtained by a receiver (not shown) to generate a combination signal. In particular, $C_T$ (838) is a transcapacitive coupling between the transmitter electrode (815) and the receiver electrode (820), $C_H$ (832) is the capacitance to earth ground of an input object (860), e.g., a user's hand, $C_{B,TX}$ (840) is the absolute capacitance (capacitance to system ground) at the transmitter electrode (815), $C_{B,RX}$ (842) is the absolute capacitance at the receiver electrode (820), $\Delta C_{B,TX}$ (836) is the capacitance between the transmitter electrode (815) and the input object (860), $\Delta C_{B,RX}$ (834) is the capacitance between the receiver electrode (820) and the input object (860), and $C_P$ (844) is the reference capacitance to earth ground in an input device (not shown) implementing the capacitive sensing scheme.

Keeping with FIG. 8, a measured capacitive profile signal of an input device may increase when measuring both a transcapacitive signal and an absolute capacitive signal. As such, a combination signal may be the sum of a transcapacitive signal and an absolute capacitive signal. Accordingly, the combination signal may provide a transcapacitive and absolute capacitive profile for capacitive sensing.

Figure 9:
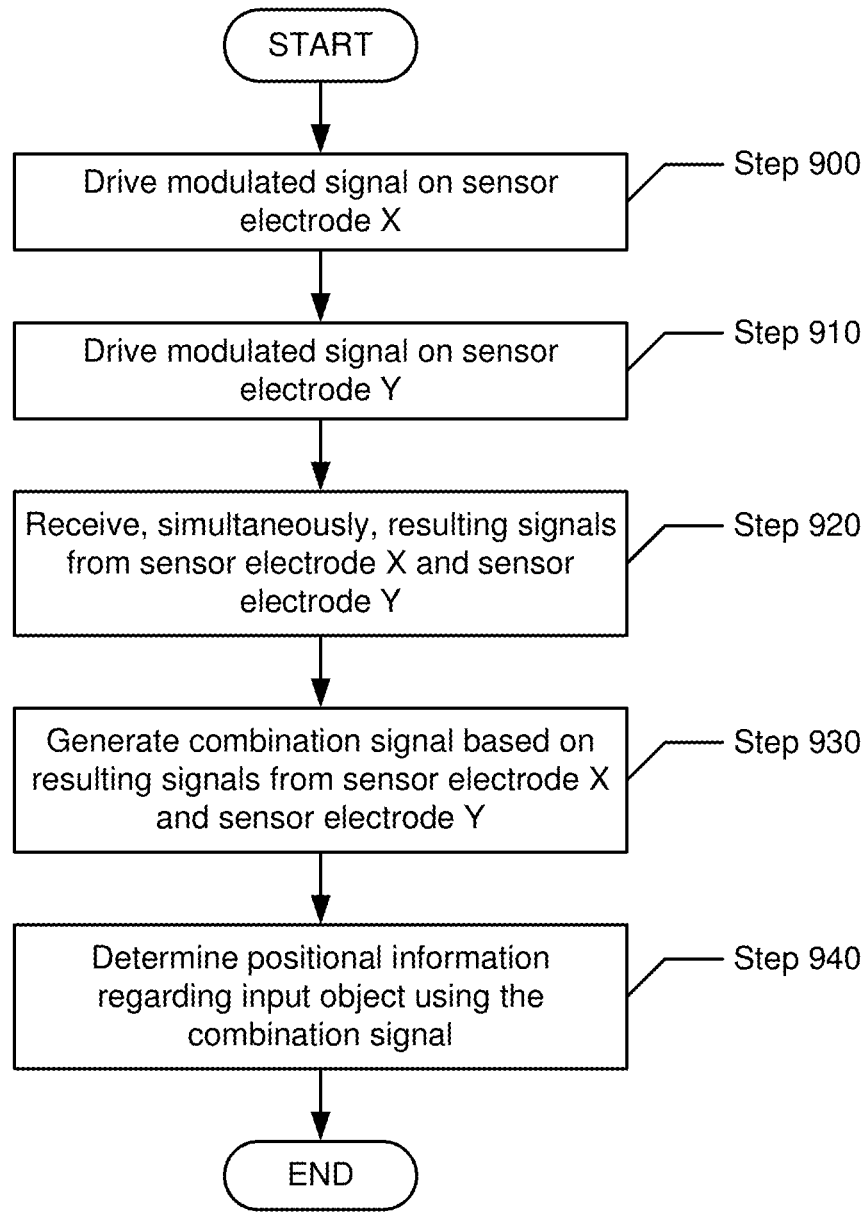
FIG. 9 shows a flowchart for capacitive sensing using combination signals, in accordance with one or more embodiments.

Turning to FIG. 9, FIG. 9 shows a flowchart in accordance with one or more embodiments. Specifically, FIG. 9 describes a method for performing capacitive sensing. The process shown in FIG. 9 may involve, for example, one or more components discussed above in reference to FIGS. 1, 2A, 2B, 3A, 3B, 4, 5, 6A, 6B, 6C, 6D, and 8 (e.g., processing system (110)). While the various steps in FIG. 9 are presented and described sequentially, one of ordinary skill in the art will appreciate that some or all of the steps may be executed in different orders, may be combined or omitted, and some or all of the steps may be executed in parallel. Furthermore, the steps may be performed actively or passively.

In Step 900, a modulated signal is driven on a sensor electrode X in accordance with one or more embodiments. In some embodiments, the modulated signal may be similar to the modulated signals described in FIG. 5 and/or the sensing signal (805) described above in FIG. 8 and the accompanying description. Likewise, sensor electrode X may be a sensor electrode similar to the transmitter electrode (815) described in FIG. 8, the transmitter electrodes and/or receiver electrodes described in FIG. 1, and the sensor electrodes described in FIGS. 2A, 2B, 3A, 3B, 4, 5, 6A, 6B, 6C, and 6D and the accompanying description.

In Step 910, a modulated signal is driven on a sensor electrode Y in accordance with one or more embodiments. In particular, the modulated signals in Steps 900 and 910 may be driven concurrently during a combined capacitive scan of a sensing region. As such, a peak-to-peak voltage amplitude of the modulated signal driven on sensor electrode X may be greater than a peak-to-peak voltage amplitude of the modulated signal driven on sensor electrode Y. Likewise, in some embodiments, the amplitudes of one or both of the modulated signals may be adjusted according to various input device states, such as low ground mass conditions, levels of background capacitance, different types of input objects, etc. As such, sensor electrode X and/or sensor electrode Y may be used as both a transmitter electrode and a receiver electrode.

In Step 920, various resulting signals are received simultaneously from sensor electrode X and sensor electrode Y in accordance with one or more embodiments. In particular, one or more of the resulting signals may correspond to changes in absolute capacitance between at least one sensor electrode and one or more input objects. Likewise, one or more of the resulting signals may correspond to changes in a mutual capacitance between sensor electrode X and sensor electrode Y.

In Step 930, a combination signal is generated based on resulting signals from sensor electrode X and sensor electrode Y in accordance with one or more embodiments. For example, sensor circuitry may be coupled to sensor electrode X and sensor electrode Y that is configured to combine two or more resulting signals into a single combination signal. Likewise, a processing system may perform various analog signal conditioning on the combination signal, e.g., with respect to filtering, amplifying, and/or adjusting one or more amplitudes of the combination signal.

In some embodiments, a capacitive scan may be performed by at least one axis of a grid electrode array. In particular, the grid electrode array may include two perpendicular vectors or subsets of sensor electrodes to measure coupling capacitances between the sensor electrodes. Along the orthogonal axis of the grid electrode array, one or more receiver electrodes may measure absolute capacitance. As such, a combined capacitive scan of the same perpendicular vector of sensor electrodes may measure transcapacitive and absolute capacitive coupling capacitances. In some embodiments, the sensor electrodes are modulated with sensing signals that have opposite phases to reduce dynamic range of the absolute capacitive measurement. For example, an absolute capacitance coupling measurement may be extracted from at least one axis of the grid electrode array by summing the combined measurement with the other transcapacitive measurement between the modulated sensor electrodes.

In some embodiments, sensor electrode X and sensor electrode Y are plates within a sensor pattern that form diamond shapes. For example, diamond-shaped plates may be closely spaced and interleaved, so that each diamond-shaped plate of rows in the sensor pattern may have at least two edges (and in most cases four edges) which are adjacent to diamond shape plates of various columns of the sensor pattern. This allows for very symmetric coupling from finger to X and Y electrodes, and for mostly space filling (e.g. on a single layer) with minimized overlap where they cross (e.g. with jumpers).

Moreover, a combination signal for a combined capacitive scan may be generated using various types of sensor electrodes: (1) modulated receiving electrodes for absolute capacitance (e.g. for one axis of the grid electrode array), (2) overguarded transmitter electrodes (with an absolute capacitance measurement), and/or (3) anti-phase (with an absolute capacitance measurement) transmitter electrodes. In some embodiments, a predetermined number of overguarded transmitter electrodes may be configured within the grid electrode array to remove a specific background capacitance charge from the receiver electrodes that measure absolute capacitance.

Furthermore, a processing system may generate a combined capacitive profile from the combination signal. The combined capacitive profile may describe a sensing region of an input device. Accordingly, the processing system may analyze the combined capacitive profile in order to determine positional information and/or object information. In some embodiments, processing systems that use transmitter electrodes, such as application specific integrated circuits (ASICs), may increase an obtain resulting signal using the combined capacitive profile that is greater than the obtained capacitive response from absolute capacitive sensing.

In one or more embodiments, capacitive sensing with a combined capacitive profile produces an increase to signal-to-circuit-noise (SNR) ratio greater than an absolute measurement profile alone. In particular, the total signal-to-circuit noise ratio may improve with the composite of the combined capacitive profile, and where the noise decreases. Moreover, in some embodiments, an input device may not require significant baseline correction using combined capacitive sensing, i.e., with respect to the charge removed for measuring a capacitive signal with respect to an input object. For example, baseline correction may be implemented using an input device with such combined capacitive sensing and/or a combined capacitive profile scheme. As such, using a combination signal may reduce the contribution of circuit noise to a signal path within the input device. As such, the increase in SNR from combined capacitive sensing may enable algorithms that may otherwise not work in various OLED panels.

In one or more embodiments, for example, implementation of combined capacitive sensing in an input device enables less baseline correction than implemented with an absolute capacitive profile and/or transcapacitive profile. Furthermore, one or more embodiments may reduce the use of overguarding to perform charge subtraction in an input device, thus reducing the amount of on-chip charge subtraction (aka CBC). Thus, combined capacitive sensing may reduce the amount of circuit area in the processing system designated for charge subtraction. Noise reduction may also be achieved with combined capacitive sensing with respect to a particular sensor electrode receiver channel.

In Step 940, when an input device is disposed in input device state X, positional information regarding one or more input objects is determined using a combination signal in accordance with one or more embodiments. For example, in response to various input device states, a processing system may determine when to use an absolute capacitive profile, a combined capacitive profile, and/or a transcapacitive profile to determine positional information and/or other object information. For example, one input device state may correspond to a change in trans-capacitance ($\Delta C_T$) due to the presence of one or more input objects in a sensing region. Another input device state may correspond to the change in absolute capacitance ($\Delta C_B$) between one or more sensor electrodes and one or more input objects. Thus, a processing system may designate one or more predetermined input device states for using the combination signal. Moreover, the processing system may use the combinational signal, resulting signals from absolute capacitive scans and/or transcapacitive scans, absolute capacitive measurements, transcapacitive measurements, etc. to determine the input device state of the input device.

In some embodiments, positional information and/or object information is determined by comparing a measured combination signal with a baseline combination signal. For example, a baseline combination signal may be generated when no input object is located in a sensing region, during a period of low interference in an input device, and/or at other predetermined times. Likewise, rather than a baseline combination signal, various combined capacitive measurements and/or absolute capacitive measurements may be used as baseline measurements to analyze the measured combination signal. Moreover, multiple baseline combination signals may be used to analyze a measured combination signal. In particular, a baseline combination signal may be generated for one or more axes of a sensor electrode pattern. When a measured combination signal is generated in response to one or more input objects in a sensing region, a processing system may thus use one or more of the baseline combination signals to determine the positional information and/or object information regarding the one or more input objects.

In some embodiments, an input device configured with a combined capacitive profile may provide the elimination of a global coarse baseline correction (GCBC) circuit. For example, a GCBC circuit may set various limits on the maximum sense frequency of absolute capacitive sensing signals. As such, an input device using combined capacitive profiles may operate at higher capacitive sensing frequencies without the GCBC circuit. In other words, the combined capacitive profile may eliminate the use of slower circuits in various input devices. In another embodiment, an input device configured to use a combined capacitive profile may reduce or eliminate baseline shifts between active modes (e.g., low-power to high-power).

In one or more embodiments, an input device includes functionality to use a combined capacitive profile to detect and measure ungrounded objects, e.g., moisture, sensitivity. For example, a combined capacitive profile may distinguish between grounded objects (e.g., human touch) and ungrounded objects (e.g., moisture/water, oil, coins, etc.). In another example, when moisture is present on an input object and/or input device, a combined capacitive profile may be sensitive to the moisture. As such, combined capacitive profiles may be used to detect moisture and/or as adjunct information to one or more moisture detection algorithms. When an input device is set to detect moisture, a combined capacitive profile may be used to determine where the moisture is located on the input device. For example, moisture may cause a negative delta response in a combined capacitive profile, while a finger may cause a positive delta response in the combined capacitive profile.

Figure 10:
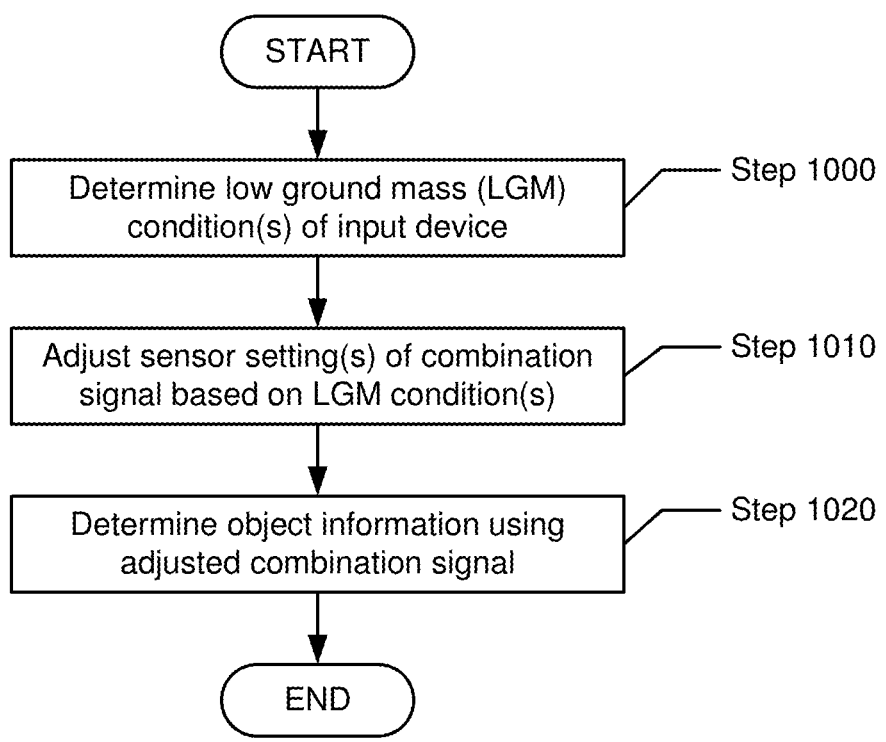
FIG. 10 shows a flowchart for adjusting sensor settings, used for obtaining combination signals under low ground mass (LGM) conditions capacitive sensing in accordance with one or more embodiments.
Figure 11:
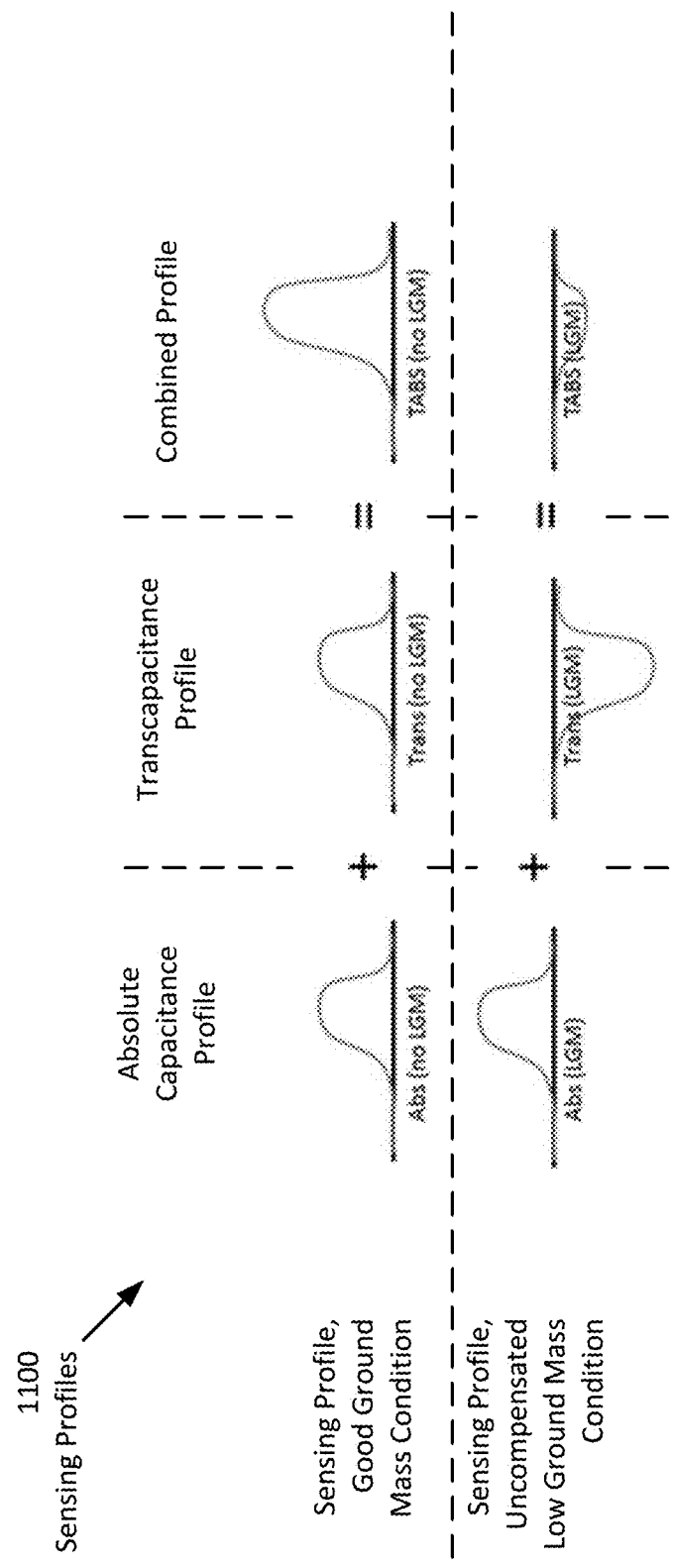
FIG. 11 shows exemplary sensing profiles in accordance with one or more embodiments.
Figure 12:
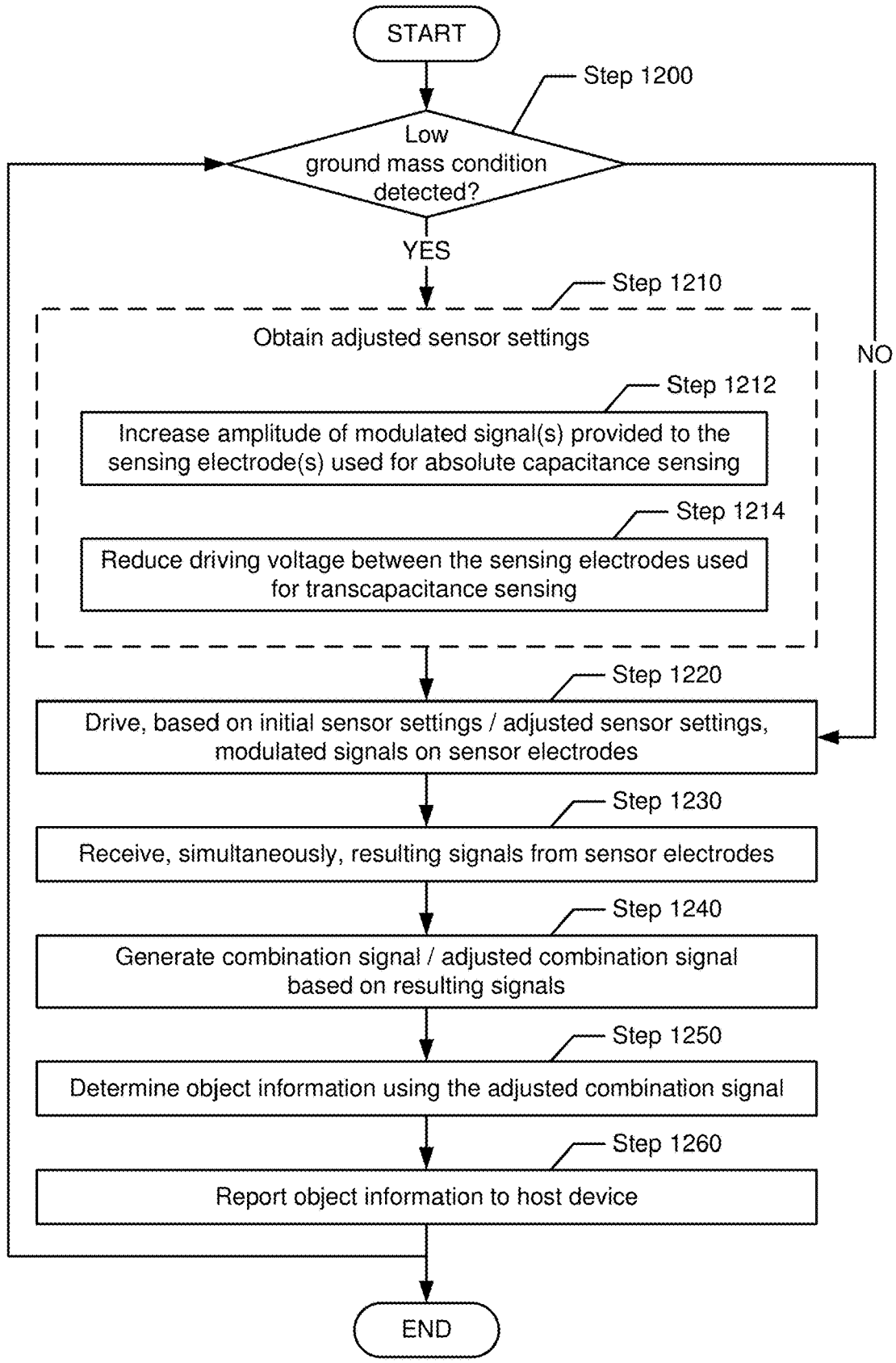
FIG. 12 shows a flowchart for determining object information under LGM conditions, in accordance with one or more embodiments.

Turning to FIG. 10, a method for adjusting sensor settings, used for obtaining combination signals under low ground mass (LGM) conditions, is shown. While FIG. 10 provides an overview of the steps involved in adjusting the sensor settings, FIG. 11 illustrates an LGM condition, and FIG. 12 provides additional details related to obtaining combination signals under LGM conditions.

One or more embodiments, as subsequently described, use combination signals to determine object information. A measured capacitive profile signal of an input device may increase when measuring both a transcapacitive signal and an absolute capacitive signal. As such, a combination signal may be the sum of a transcapacitive signal and an absolute capacitive signal.

Low ground mass conditions (LGM) may affect transcapacitive signals. As a result, in one or more embodiments, under LGM conditions, determining object information based on transcapacitive signals is impaired. Because combination signals include transcapacitive signals, combination signals may be affected by LGM conditions as well.

Continuing with the discussion of FIG. 10, in Step 1000 it is determined that an LGM condition exists, based on the signals received from the input device. In one or more embodiments, the determination is made based on signals (e.g., absolute capacitive signals, transcapacitive signals and/or combination signals) that were obtained using initial sensor settings. These initial sensor settings were used to drive sensor electrodes of the input device as described, for example, with reference to FIGS. 7A-7G and FIG. 9. While these initial sensor settings may be selected to allow the measurement of an absolute, transcapacitive and/or combination signal, in one or more embodiments, these initial sensor settings are not optimized for LGM conditions. As a result, undesirable sensing profiles may be obtained under LGM conditions, when using the initial sensor settings, as illustrated in FIG. 11. Additional details regarding how an LGM condition may be detected are provided in Step 1200 of FIG. 12.

Figure 13:
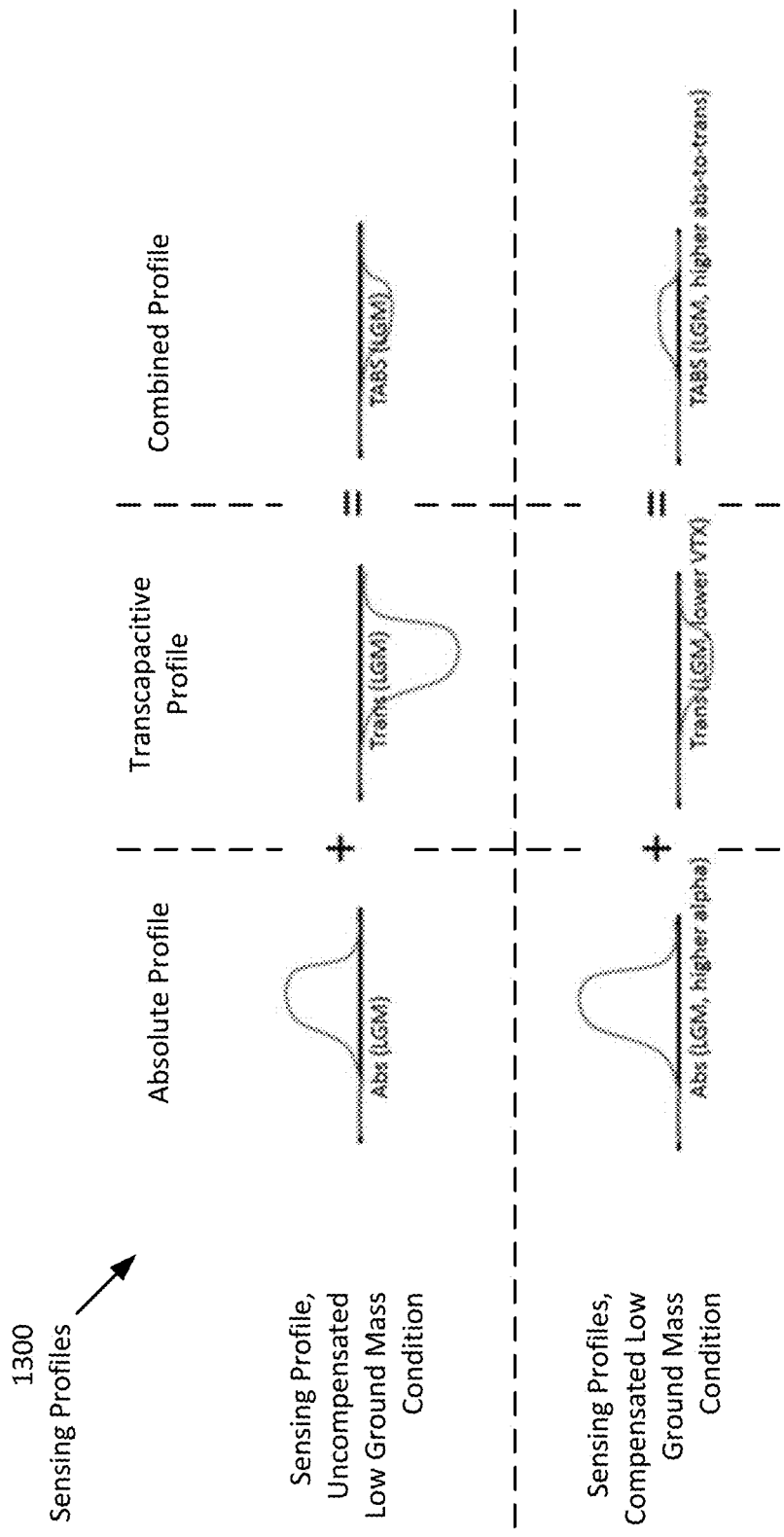
FIG. 13 shows exemplary sensing profiles in accordance with one or more embodiments.

In Step 1010, based on the determination that an LGM conditions exists, sensor settings, used to obtain combination signals, are adjusted. The sensor settings may be adjusted to optimize the combination signal for the presence of the LGM conditions. In one or more embodiments, the adjusted sensor settings are better suited to obtaining combination signals than the initial sensor settings. As a result of using the adjusted sensor settings rather than the initial sensor settings, a useful combination signal may be obtained under LGM conditions, as illustrated in FIG. 13. Additional details regarding the adjustment of the sensor settings are provided in Step 1210 of FIG. 12.

In some embodiments, Step 1010 is performed by a state machine. The firmware in a processing system may include the state machine which may use an estimate of the current ground conditions of the input device as an input. For example, the input may specify that an LGM condition is present or that no LGM condition is present. Further, the input may distinguish various levels of LGM conditions. The output of the state machine may be a specification of how the sensor settings are to be adjusted to obtain an adjusted combination signal. The output of the state machine may be provided to a processing system to update the modulation of the signals on the sensor electrodes.

In Step 1020, object information is obtained using the adjusted combination signal that is based on the adjusted sensor settings. In some embodiments, the assumption is that the adjusted sensor settings results in a superior combination signal, enabling a better reconstruction of object information, in comparison to using the initial sensor settings. Additional details regarding obtaining the object information are provided in Steps 1220-1250 of FIG. 12.

The method shown in FIG. 10 may be repeated, thus enabling dynamic adjustment of the sensor signals as LGM conditions change.

Turning to FIG. 11, sensing profiles (1100) are shown. The sensing profiles illustrate sensing under good ground mass conditions (top row) and under low ground mass conditions (bottom row), when no compensation is applied to the sensed signals. In the left column, absolute capacitance profiles are shown, in the center column, transcapacitance profiles are shown, and in the right column, combined profiles are shown. A combined profile may be a result of additively combining the corresponding absolute capacitance profile and the corresponding transcapacitive profile.

The sensing profiles (1100) may be obtained as follows. In some embodiments, the absolute capacitance and transcapacitance are measured simultaneously. Receiver (RX) electrodes may be in an absolute capacitance configuration, and the transmitter (TX) electrodes may be in a transcapacitance configuration. Thus, the RX electrodes may be modulated as in absolute capacitance sensing (as previously described), while the TX electrodes may be modulated at a different voltage as in transcapacitance sensing (as previously described). The modulation between the RX and TX electrodes may have opposite polarities so that an overall touch signal is enhanced, while a baseline signal (associated with a background capacitance, as previously described) may be decreased.

This approach may, thus, result in a greater Signal-to-Noise Ratio (SNR) under well-grounded conditions. However, as illustrated in FIG. 11, this may also result in the transcapacitance signal being pushed to zero or even negative under LGM conditions, while the absolute capacitance signal may not be affected. As shown in the bottom row of FIG. 11, LGM conditions may therefore result in a weak or even negative combined profile, thereby negatively affecting the ability to sense an input object based on the combined profile. The degree to which LGM conditions occur may be specific to the design of the capacitive sensing device. For example, the pattern and/or stack-up of the sensor may affect the susceptibility to LGM issues. A sensor with a thick lens may be less prone to LGM issues than a sensor with a very thin stack-up.

Turning to FIG. 12, a method for determining object information under LGM conditions is shown. FIG. 12 provides an in-depth description of the method introduced in FIG. 10. While the various steps in FIG. 12 are presented and described sequentially, one of ordinary skill in the art will appreciate that some or all of the steps may be executed in different orders, may be combined or omitted, and some or all of the steps may be executed in parallel. Furthermore, the steps may be performed actively or passively.

In Step 1200, a determination is made about whether an LGM condition exists. The determination may be made in various ways. The following discussion provides examples for methods that enable detection of LGM conditions.

A low ground mass state may correspond to an inverted capacitive response for a sensing region. In less severe cases, a low ground mass state may correspond to a reduction in amplitude over the capacitive response. Accordingly, in one embodiment, the detection of an LGM condition is based on a difference in shape and/or amplitude between the transcapacitive profiles under good and low ground mass conditions, as illustrated, for example, in FIG. 11. For example, the direction of the deflection (positive or negative) and/or the amplitude may be considered. To assess the amplitude, the average magnitude, peak magnitude, and/or area under the curve may be considered. In one or more embodiments, a transcapacitance measurement that does not reach at least a specified positive amplitude may be considered and indication for LGM conditions. The detection of LGM conditions may further be performed based on other characteristics. For example, a transcapacitance profile may typically include saturated signal values as soon as an input object reaches a certain size. For any larger input objects, these signal values may not increase any further. Accordingly, an LGM condition may be detected if the signal values do not reach saturation, as typically expected for a given object size. Similarly, the absolute profile may be used to detect LGM conditions. The absolute profile typically varies depending on the size of the input object. For example, the amplitude of the absolute profile may change, while the overall shape may remain constant. If the relationship of the absolute profile and the size of the input object is known, a deviation from this relationship may serve as an indication for an LGM condition. A lookup table may be used, for example, to document this relationship.

If a determination is made that an LGM condition exists, the execution of the method may proceed with Step 1210. Alternatively, if no LGM condition was detected, the execution of the method may directly proceed to Step 1220.

In Step 1210, adjusted sensor settings are obtained, to improve the sensing of objects using combination signals. In some embodiments, the sensor settings are adjusted to increase the contribution of the absolute capacitance signal relative to the transcapacitive signal in the combined signal. As a result, the deterioration of transcapacitive signal as a result of the LGM condition may have a reduced effect on the combined signal. Using the adjusted sensor settings may result in a more robust performance under LGM conditions, while still providing the benefits of combined signals when operating in good grounding conditions. The ratio of the absolute capacitance signal relative to the transcapacitive signal may be adjusted as follows.

In Step 1212, in one embodiment, the contribution of the absolute capacitance signal is modulated by increasing the amplitude of the modulated signal(s) provided to the sensing electrode(s) used for absolute capacitance sensing.

In Step 1214, in one embodiment, the contribution of the transcapacitance signal is modulated by reducing the driving voltage between the sensing electrodes used for transcapacitance sensing.

In some embodiments, the increase of the amplitude of the modulated signal(s) provided to the sensing electrode(s) used for capacitive sensing and the decrease of the driving voltage between the sensing electrodes used for transcapacitance sensing may be applied in combination. Whether, and to what degree, Step 1212 and Step 1214 are relied upon to address an LGM condition may depend on the severity of the LGM condition. For example, if a reasonable but less than ideal signal to noise ratio (SNR) is obtained under an LGM condition (e.g., SNR≈1.2 . . . 1.5), one may rely on Step 1212 by increasing the absolute capacitance signal. Alternatively, if a poor SNR is obtained under an LGM condition (e.g., SNR≈0.5 . . . 0.8), one may rely on Step 1214 by decreasing the transcapacitance signal. Those skilled in the art will appreciate that Steps 1212 and 1214 may be performed to any degree, as necessary or desirable to obtain a combined profile. Increases and decreases may be performed in increments, based on the severity of the LGM condition. For example, two to four increments may be established for each the increase and the decrease of the absolute capacitance signal and the transcapacitance signal, respectively. These increments may be predefined based on known sensor characteristics, expected environmental conditions, and/or experimentation.

Adjusting parameters of absolute and or transcapactive sensing, as described, may result in a shift of the baseline, as previously discussed. If not considered, the shifted baseline may result in a deteriorating object detection. Accordingly, the shifted baseline may be considered using adjusted baseline values that are suitable for the adjusted sensing parameters. These adjusted baselines may be either modeled, or they may be stored, e.g., in a lookup table. The adjusted baselines may, thus, be part or the adjusted sensor settings determined in Step 1210.

In Step 1220, modulated signals that are based on the adjusted sensor settings are provided to the sensor electrodes. Alternatively, if based on the determination of Step 1200 no adjustment of the sensor settings was performed, the modulated signals may be based on the initial sensor settings. The modulated signals and/or the sensor electrodes may be similar to the modulated signals and/or sensor electrodes described above in Steps 900 and 910 and the accompanying description.

In some embodiments, combined sensing is performed by driving a sensing signal onto a sensor electrode for the purposes of measuring absolute capacitance with that sensor electrode and, simultaneously with the driving of that sensor electrode, other sensor electrodes that cross and do not cross that sensor electrode may be used as receivers to obtain transcapacitive measurements between themselves and the driven sensor electrode.

In combined capacitive sensing, a sensor module may operate to drive a modulated transmitter signal on one sensor electrode of a sensor electrode pattern while receiving resulting signals (which include effects that result from the transmitter signal) on at least one and up to all other sensor electrodes of the sensor electrode pattern, and while simultaneously also using the modulated transmitter signal to charge and then receive resulting signals from the driven sensor electrode for measuring absolute capacitance with that sensor electrode. That is, the sensor module may operate to both drive and receive signals in a manner that facilitates simultaneous absolute capacitive sensing and transcapacitive sensing. It should be appreciated that, when performing combined capacitive sensing, the sensor module may drive transmitter signals on more than one sensor electrode either concurrently or at different times. Further, a processing system may be configured to receive resulting signals corresponding to an absolute capacitive coupling on more than one sensor electrode either concurrently or at different times. As described earlier, the transmitter signal may be substantially orthogonal, such that they are orthogonal in time, code, frequency, etc.

In Step 1230, various resulting signals are simultaneously received from various sensor electrodes in accordance with one or more embodiments. The resulting signals may be similar to the resulting signals described above in Step 920 and the accompanying description.

In Step 1240, a combination signal or an adjusted combination signal (if adjusted sensor settings were used in Step 1220) is generated based on various resulting signals from various sensor electrodes in accordance with one or more embodiments. The combination signal may be generated in a similar manner as the combination signal described above in Step 930 and the accompanying description.

In Step 1250, object information is determined using the combination signal obtained as previously described, e.g., with reference to FIG. 9, in accordance with one or more embodiments. For example, object information may include various characteristics of one or more input objects, such as input object size and/or the type of input object, e.g., an index finger, a palm, a user's face, stylus, etc. Likewise, a processing system may determine object information from a combination signal's combined capacitive profile, for example, by comparing the combination signal with one or more capacitive templates corresponding to various capacitive profiles, for example.

In Step 1260, the object information is reported to a host device in accordance with one or more embodiments. Object information may include various characteristics of one or more input objects, such as input object size and/or the type of input object, e.g., an index finger, a palm, a user's face, stylus, etc. A processing system may determine object information from a combination signal's combined capacitive profile, for example, by comparing the combination signal with one or more capacitive templates corresponding to various capacitive profiles, for example. Moreover, the object information may be reported to a host device, such as an electronic system coupled to an input device. On the host device, the information may trigger one or more interface actions within a graphical user interface. For example, interface actions may include opening, moving, and/or closing windows within a graphical user interface. For more information on graphical user interfaces and interface actions, see FIG. 14 below and the accompanying description.

After the completion of Step 1260, the method may either terminate, or alternatively, the execution may continue with Step 1200 to repeat the described steps.

While not shown in the flowchart of FIG. 12, once the LGM condition no longer applies, the execution of the method may return to using the initial sensor settings.

Turning to FIG. 13, sensing profiles (1300) are shown. The sensing profiles illustrate sensing under low ground mass conditions with no compensation applied (top row), and under low ground mass conditions with a compensation applied (bottom row) as described in FIG. 12. Analogous to FIG. 11, in the left column absolute capacitance profiles are shown, in the center column transcapacitance profiles are shown, and in the right column combined profiles are shown.

As previously described with reference to FIG. 11, under LGM conditions, the transcapacitance signal may be pushed to zero or even negative under LGM conditions, while the absolute capacitance signal may not be affected. As shown in the bottom row of FIG. 11, LGM conditions may therefore result in a weak or even negative combined profile, thereby negatively affecting the ability to measure an input object based on the combined profile (bottom row of graphs in FIG. 11, top row of graphs in FIG. 13). The combined profile with the negative amplitude, as shown in FIGS. 11 and 13, may not be useful for sensing objects, based on the object sensing expecting a combined profile with a positive amplitude.

Application of the method described in FIG. 12 results in the changes shown in the bottom row of graphs in FIG. 13. Specifically, as a result of the increased amplitude of the modulated signal(s) provided to the sensing electrode(s) used for absolute capacitance sensing, the amplitude of the resulting adjusted absolute profile increases. Further, as a result of the reduced driving voltage between the sensing electrodes used for transcapacitance sensing, the negative amplitude in the resulting adjusted transcapacitive profile is reduced. Combination of the adjusted absolute profile and the adjusted transcapacitive profile results in a combined profile with a positive amplitude, thereby enabling the sensing of objects, in presence of LGM conditions.

Figure 14:
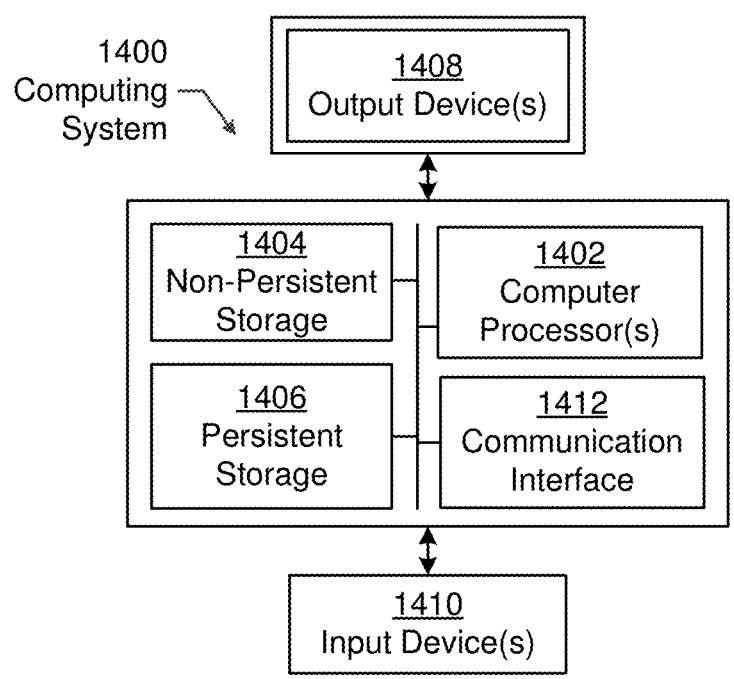
FIG. 14 shows a computing system in accordance with one or more embodiments.

Embodiments may be implemented on a computing system. Any combination of mobile, desktop, server, router, switch, embedded device, or other types of hardware may be used. For example, as shown in FIG. 14, the computing system (1400) may include one or more computer processors (1402), non-persistent storage (1404) (e.g., volatile memory, such as random access memory (RAM), cache memory), persistent storage (1406) (e.g., a hard disk, an optical drive such as a compact disk (CD) drive or digital versatile disk (DVD) drive, a flash memory, etc.), a communication interface (1412) (e.g., Bluetooth interface, infrared interface, network interface, optical interface, etc.), and numerous other elements and functionalities.

The computer processor(s) (1402) may be an integrated circuit for processing instructions. For example, the computer processor(s) may be one or more cores or micro-cores of a processor. The computing system (1400) may also include one or more input devices (1410), such as a touchscreen, keyboard, mouse, microphone, touchpad, electronic pen, or any other type of input device.

The communication interface (1412) may include an integrated circuit for connecting the computing system (1400) to a network (not shown) (e.g., a local area network (LAN), a wide area network (WAN) such as the Internet, mobile network, or any other type of network) and/or to another device, such as another computing device.

Further, the computing system (1400) may include one or more output devices (1408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1402), non-persistent storage (1404), and persistent storage (1406). Many different types of computing systems exist, and the aforementioned input and output device(s) may take other forms.

Software instructions in the form of computer readable program code to perform embodiments of the disclosed technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosed technology.

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the disclosed technology. The processes may be part of the same or different application and may execute on the same or different computing system.

Rather than or in addition to sharing data between processes, the computing system performing one or more embodiments of the disclosed technology may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosed technology, may extract one or more data items from the obtained data. For example, the extraction may be performed as follows by the computing system (1400) in FIG. 14. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 14, while performing one or more embodiments of the disclosed technology, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the disclosed technology, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 14 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The computing system of FIG. 14 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions present only a few examples of functions performed by the computing system of FIG. 14. Other functions may be performed using one or more embodiments of the disclosed technology.

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed.

What is claimed is:

1. A processing system comprising:
a set of instructions executing on the processing system, the set of instructions configured to make a determination that a low ground mass (LGM) condition associated with an input device exists in an initial combination signal obtained from a sensor module using initial sensor settings, and based on the determination:
    determine adjusted sensor settings, and
    obtain an adjusted combination signal, using the adjusted sensor settings, and
    obtain, using the adjusted combination signal, object information for one or more input objects in a sensing region of the input device; and
the sensor module configured to:
    generate, using a first sensor electrode, a second sensor electrode, and the adjusted sensor settings, the adjusted combination signal,
    wherein the adjusted combination signal comprises effects of a transcapacitive coupling between the first sensor electrode and the second sensor electrode and effects of an absolute capacitive coupling between the second sensor electrode and the input object.

2. The processing system of claim 1, wherein the set of instructions is further configured to:
make a second determination that the LGM condition exists in the adjusted combination signal, and based on the second determination:
    update the adjusted sensor settings, and
    obtain an updated adjusted combination signal, using the updated adjusted sensor settings, and
    obtain, using the updated adjusted sensor signal, updated object information for the one or more input objects.

3. The processing system of claim 1, wherein generating the adjusted combination signal comprises:
driving a first modulated signal onto the first sensor electrode and a second modulated signal onto the second sensor electrode, wherein the first and the second modulated signals are governed by the adjusted sensor settings,
receiving, simultaneously, a first resulting signal from the first sensor electrode and a second resulting signal from the second sensor electrode,
wherein the adjusted combination signal is based at least in part on the first resulting signal and the second resulting signal.

4. The processing system of claim 3, wherein the adjusted sensor settings comprise a change of an amplitude of the second modulated signal that is driven onto the second sensor electrode.

5. The processing system of claim 3, wherein the adjusted sensor settings comprise a change of a trans-capacitance driving voltage between the first sensor electrode and the second sensor electrode.

6. The processing system of claim 1, wherein making the determination that the LGM condition exists in the initial combination signal comprises:
driving a first modulated signal onto the first sensor electrode,
obtaining a resulting signal from the second sensor electrode in response to driving the first modulated signal onto the first sensor electrode,
determining a transcapacitance measurement between the first sensor electrode and the second sensor electrode using the resulting signal, and
determining that the LGM condition exists, based on the transcapacitance measurement being below a specified threshold.

7. The processing system of claim 1, wherein the effects of the transcapacitive coupling and the effects of the absolute capacitive coupling are additively combined to obtain the adjusted combination signal.

8. The processing system of claim 1,
wherein a first baseline shift is associated with the initial combination signal,
wherein a second baseline shift is associated with the adjusted combination signal,
wherein the set of instructions is further configured to select the second baseline shift based on the adjusted sensor settings, and
wherein the object information is determined from the adjusted combination signal using the second baseline shift.

9. The processing system of claim 1, wherein the set of instructions is further configured to report the object information to a host device, wherein the object information triggers an interface action in a graphical user interface operating on the host device.

10. A capacitive sensing input system comprising:
a plurality of sensor electrodes disposed in a sensor electrode pattern, the plurality of sensor electrodes comprising a first sensor electrode and a second sensor electrode;
a sensor module, the sensor module configured to:
    obtain an initial combination signal using initial sensor settings;
a set of instructions executing on a processing system, the set of instructions configured to make a determination that a low ground mass (LGM) condition associated with the capacitive sensing input system exists in the initial combination signal, and based on the determination determine adjusted sensor settings;
the sensor module further configured to:
    obtain, using the first sensor electrode, the second sensor electrode, and the adjusted sensor settings, an adjusted combination signal,
        wherein the adjusted combination signal comprises effects of a transcapacitive coupling between the first sensor electrode and the second sensor electrode and effects of an absolute capacitive coupling between the second sensor electrode and the input object; and
the set of instructions further configured to:
    obtain, using the adjusted combination signal, object information for one or more input objects in a sensing region of the capacitive sensing input system.

11. The capacitive sensing input system of claim 10,
wherein the set of instructions is further configured to:
    make a second determination that the LGM condition exists in the adjusted combination signal, and based on the second determination, update the adjusted sensor settings,
wherein the sensor module is further configured to:
    obtain an updated adjusted combination signal, using the updated adjusted sensor settings, and
wherein the set of instructions is further configured to:

obtain, using the updated adjusted sensor signal, updated object information for the one or more input objects;

12. The capacitive sensing input system of claim 10, wherein generating the adjusted combination signal comprises:
 driving a first modulated signal onto the first sensor electrode and a second modulated signal onto the second sensor electrode, wherein the first and the second modulated signals are governed by the adjusted sensor settings,
 receiving, simultaneously, a first resulting signal from the first sensor electrode and a second resulting signal from the second sensor electrode,
 wherein the adjusted combination signal is based at least in part on the first resulting signal and the second resulting signal.

13. The capacitive sensing input system of claim 10, wherein making the determination that the LGM condition exists in the initial combination signal comprises:
 driving a first modulated signal onto the first sensor electrode,
 obtaining a resulting signal from the second sensor electrode in response to driving the first modulated signal onto the first sensor electrode,
 determining a transcapacitance measurement between the first sensor electrode and the second sensor electrode using the resulting signal, and
 determining that the LGM condition exists, based on the transcapacitance measurement being below a specified threshold.

14. The capacitive sensing input system of claim 10, wherein the effects of the transcapacitive coupling and the effects of the absolute capacitive coupling are additively combined to obtain the adjusted combination signal.

15. The capacitive sensing input system of claim 10,
 wherein a first baseline shift is associated with the initial combination signal,
 wherein a second baseline shift is associated with the adjusted combination signal,
 wherein the set of instructions is further configured to select the second baseline shift based on the adjusted sensor settings, and
 wherein the object information is determined from the adjusted combination signal using the second baseline shift.

16. A method of capacitive sensing, the method comprising:
 making a determination that a low ground mass (LGM) condition associated with an input device exists in an initial combination signal obtained from a sensor module using initial sensor settings, and based on the determination:
 determine adjusted sensor settings;
 obtain an adjusted combination signal, using the adjusted sensor settings;
 obtain, using the adjusted combination signal, object information for one or more input objects in a sensing region of the input device;
 generate, using a first sensor electrode, a second sensor electrode, and the adjusted sensor settings, the adjusted combination signal,
 wherein the adjusted combination signal comprises effects of a transcapacitive coupling between the first sensor electrode and the second sensor electrode and effects of an absolute capacitive coupling between the second sensor electrode and the input object.

17. The method of claim 16, further comprising:
 making a second determination that the LGM condition exists in the adjusted combination signal, and based on the second determination:
 update the adjusted sensor settings, and
 obtain an updated adjusted combination signal, using the updated adjusted sensor settings, and
 obtain, using the updated adjusted sensor signal, updated object information for the one or more input objects.

18. The method of claim 16, wherein generating the adjusted combination signal comprises:
 driving a first modulated signal onto the first sensor electrode and a second modulated signal onto the second sensor electrode, wherein the first and the second modulated signals are governed by the adjusted sensor settings,
 receiving, simultaneously, a first resulting signal from the first sensor electrode and a second resulting signal from the second sensor electrode,
 wherein the adjusted combination signal is based at least in part on the first resulting signal and the second resulting signal.

19. The method of claim 16, wherein making the determination that the LGM condition exists in the initial combination signal comprises:
 driving a first modulated signal onto the first sensor electrode,
 obtaining a resulting signal from the second sensor electrode in response to driving the first modulated signal onto the first sensor electrode,
 determining a transcapacitance measurement between the first sensor electrode and the second sensor electrode using the resulting signal, and
 determining that the LGM condition exists, based on the transcapacitance measurement being below a specified threshold.

20. The method of claim 16, wherein the effects of the transcapacitive coupling and the effects of the absolute capacitive coupling are additively combined to obtain the adjusted combination signal.

\* \* \* \* \*